United States Patent
Shimotani et al.

(10) Patent No.: US 10,967,879 B2
(45) Date of Patent: Apr. 6, 2021

(54) AUTONOMOUS DRIVING CONTROL PARAMETER CHANGING DEVICE AND AUTONOMOUS DRIVING CONTROL PARAMETER CHANGING METHOD

(71) Applicant: MITSUBISHI ELECTRIC CORPORATION, Tokyo (JP)

(72) Inventors: Mitsuo Shimotani, Tokyo (JP); Yoshitaka Nakamura, Tokyo (JP); Tadashi Miyahara, Tokyo (JP); Naohiko Obata, Tokyo (JP); Tsutomu Matsubara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 121 days.

(21) Appl. No.: 16/320,215

(22) PCT Filed: Oct. 3, 2016

(86) PCT No.: PCT/JP2016/079254
§ 371 (c)(1),
(2) Date: Jan. 24, 2019

(87) PCT Pub. No.: WO2018/066026
PCT Pub. Date: Apr. 12, 2018

(65) Prior Publication Data
US 2019/0270458 A1 Sep. 5, 2019

(51) Int. Cl.
*B60W 50/10* (2012.01)
*B60K 35/00* (2006.01)
(Continued)

(52) U.S. Cl.
CPC ........... *B60W 50/10* (2013.01); *B60K 35/00* (2013.01); *B60K 37/06* (2013.01); *G06F 3/0486* (2013.01);
(Continued)

(58) Field of Classification Search
CPC .................................................... B60W 50/10
See application file for complete search history.

(56) References Cited

U.S. PATENT DOCUMENTS 8,214,125 B2 * 7/2012 Nanami ................ B60W 40/04
701/93
9,092,987 B2 * 7/2015 Bone ...................... G08G 1/167
(Continued)

FOREIGN PATENT DOCUMENTS

| JP | 2005-29128 A | 2/2005 |
| JP | 2008-120305 A | 5/2008 |
| JP | 5910903 B1 | 4/2016 |

OTHER PUBLICATIONS

International Search Report for PCT/JP2016/079254 dated Dec. 27, 2016.
(Continued)

*Primary Examiner* — Michael A Berns
(74) *Attorney, Agent, or Firm* — Birch, Stewart, Kolasch & Birch, LLP

(57) ABSTRACT

An object of the present invention is to implement, at a low hardware cost, a device that changes an autonomous driving control parameter whose step size is variably set. An autonomous driving control parameter changing device according to the present invention includes, a gesture operation acquisition unit that acquires information on a gesture operation for moving the operation target icon, a parameter changing unit that changes the autonomous driving control parameter in an increase or decrease direction defined in association with a movement direction in which the operation target icon is moved, and a step size setting unit that variably sets a step size based on a predetermined condition, the step size corresponding to an amount of change in the autonomous driving control parameter made by the parameter changing
(Continued)

unit per occurrence of the gesture operation, and the change operation screen includes a display of the step size.

14 Claims, 23 Drawing Sheets

(51) Int. Cl.
*G06F 3/0481* (2013.01)
*G06F 3/0486* (2013.01)
*G06F 3/0488* (2013.01)
*B60K 37/06* (2006.01)
*B60W 50/00* (2006.01)

(52) U.S. Cl.
CPC ........ *G06F 3/0488* (2013.01); *G06F 3/04817* (2013.01); *B60K 2370/1438* (2019.05); *B60K 2370/1468* (2019.05); *B60K 2370/167* (2019.05); *B60K 2370/175* (2019.05); *B60K 2370/179* (2019.05); *B60W 2050/0063* (2013.01)

(56) References Cited

U.S. PATENT DOCUMENTS

| | | | |
|---|---|---|---|
| 10,160,451 B2* | 12/2018 | Yamada | B60W 30/14 |
| 10,532,763 B2* | 1/2020 | Yamada | B60W 50/10 |
| 10,625,608 B2* | 4/2020 | Akaike | B60R 11/0235 |
| 2009/0240398 A1 | 9/2009 | Nanami | |
| 2017/0225702 A1 | 8/2017 | Yamada et al. | |
| 2019/0270458 A1* | 9/2019 | Shimotani | B60K 37/06 |

OTHER PUBLICATIONS

Japanese Office Action, dated Oct. 1, 2019, for Japanese Application No. 2018-543484, with an English translation.

* cited by examiner

F I G . 3
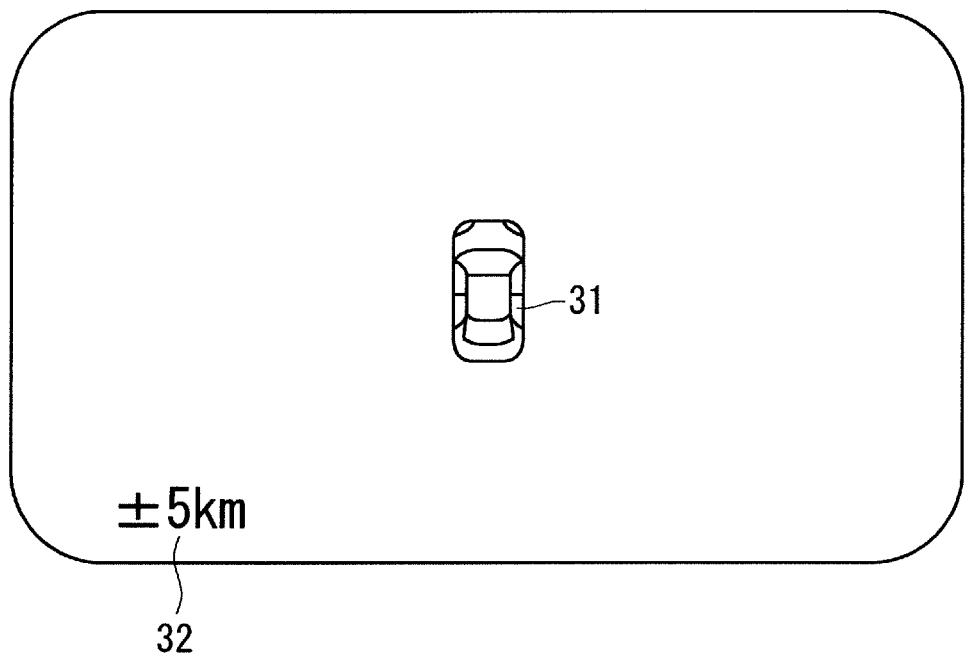
F I G . 4
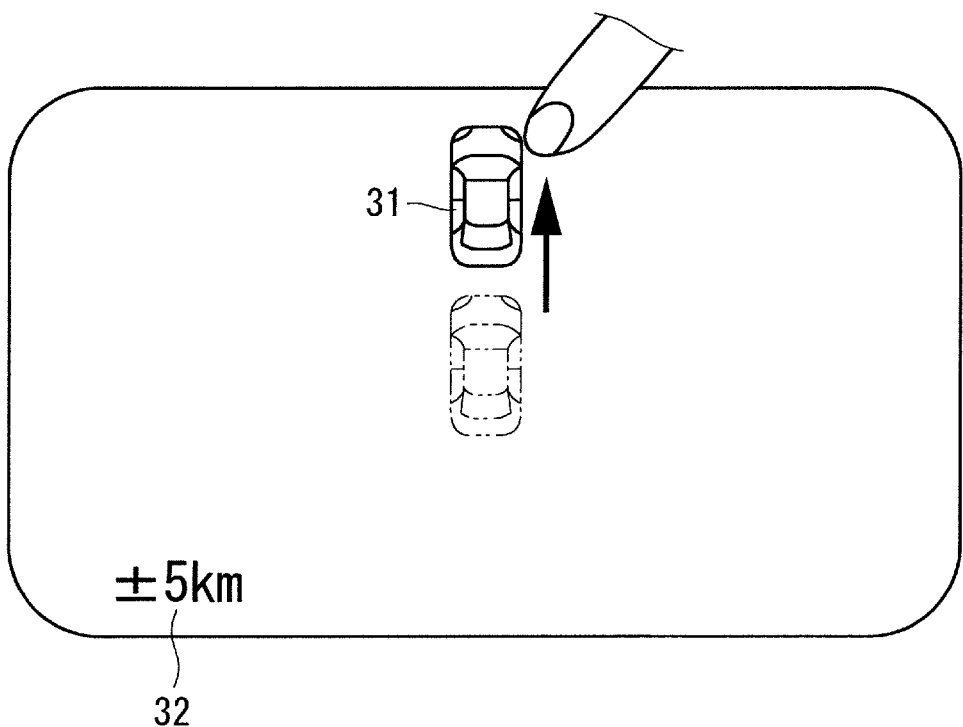

AUTONOMOUS DRIVING CONTROL PARAMETER CHANGING DEVICE AND AUTONOMOUS DRIVING CONTROL PARAMETER CHANGING METHOD

TECHNICAL FIELD

The present invention relates to a technique for changing an autonomous driving control parameter.

BACKGROUND ART

In recent years, an autonomous driving control device that controls various actuators involved in travel control of a vehicle to perform autonomous driving control on the vehicle has been developed. Further, various techniques for allowing a driver to change an autonomous driving control parameter that is a parameter used by the autonomous driving control device for autonomous driving control of a vehicle have been proposed.

For example, Patent Document 1 discloses a technique for allowing a driver to change a set speed under steady travel control by operation of a switch. In the technique disclosed in Patent Document 1, a step size of the set speed per operation of the switch is determined to be larger as a vehicle speed at the time of operation of the switch is higher.

Further, Patent Document 2 discloses a technique for allowing a driver to change a set vehicle speed under cruise control by operation of a cruise lever. In the technique disclosed in Patent Document 2, a step size of the set vehicle speed per operation of the cruise lever when a vehicle is traveling in a passing lane is set larger than a step size when the vehicle is traveling in a traveling lane.

PRIOR ART DOCUMENTS

Patent Documents

Patent Document 1: Japanese Patent Application Laid-Open No. 2005-029128
Patent Document 2: Japanese Patent Application Laid-Open No. 2008-120305

SUMMARY

Problem to be Solved by the Invention

According to the techniques disclosed in Patent Documents 1, 2, it is possible for the driver to change, by operation of a mechanical switch, the set speed under the steady travel control that is an example of the autonomous driving control parameter. However, in these techniques, in order to allow the driver to grasp the step size of the set speed that is variably set in accordance with various conditions, the step size needs to be displayed on a display device or the like prepared separately from the mechanical switch, which leads to an increase in hardware cost.

In view of the above problem, it is an object of the present invention to implement, at a low hardware cost, a device that changes an autonomous driving control parameter whose step size is variably set.

Means to Solve the Problem

An autonomous driving control parameter changing device according to the present invention that changes an autonomous driving control parameter that is a parameter used by an autonomous driving control device for autonomous driving control of a vehicle includes a display control unit that causes a display device to display a change operation screen of the autonomous driving control parameter including an operation target icon, a gesture operation acquisition unit that acquires information on a gesture operation for moving the operation target icon in a predetermined direction, a parameter changing unit that changes the autonomous driving control parameter in an increase or decrease direction defined in association with a movement direction in which the operation target icon is moved by the gesture operation, and a step size setting unit that variably sets a step size based on a predetermined condition, the step size corresponding to an amount of change in the autonomous driving control parameter made by the parameter changing unit per occurrence of the gesture operation. The change operation screen includes a display of the step size.

An autonomous driving control parameter changing method according to the present invention for changing an autonomous driving control parameter that is a parameter used by an autonomous driving control device for autonomous driving control of a vehicle includes causing a display device to display a change operation screen of the autonomous driving control parameter including an operation target icon, acquiring information on a gesture operation for moving the operation target icon in a predetermined direction, changing the autonomous driving control parameter in an increase or decrease direction defined in association with a movement direction in which the operation target icon is moved by the gesture operation, and setting a set size variably based on a predetermined condition, the set size corresponding to an amount of change in the autonomous driving control parameter per occurrence of the gesture operation. The change operation screen includes a display of the set size.

Effects of the Invention

The autonomous driving control parameter changing device according to the present invention includes the display control unit that causes the display device to display the change operation screen of the autonomous driving control parameter including the operation target icon, the gesture operation acquisition unit that acquires information on the gesture operation for moving the operation target icon in the predetermined direction, the parameter changing unit that changes the autonomous driving control parameter in the increase or decrease direction defined in association with the movement direction in which the operation target icon is moved by the gesture operation, and the step size setting unit that variably sets the step size based on the predetermined condition, the step size corresponding to the amount of change in the autonomous driving control parameter made by the parameter changing unit per occurrence of the gesture operation. The change operation screen includes the display of the step size. Therefore, since both the gesture operation and the display of the step size are enabled on the change operation screen, it is possible to reduce a hardware cost of the autonomous driving control parameter changing device.

The autonomous driving control parameter changing method according to the present invention includes causing the display device to display the change operation screen of the autonomous driving control parameter including the operation target icon, acquiring information on the gesture operation for moving the operation target icon in the predetermined direction, changing the autonomous driving control parameter in the increase or decrease direction defined in association with the movement direction in which the operation target icon is moved by the gesture operation, and setting the set size variably based on the predetermined condition, the set size corresponding to the amount of change in the autonomous driving control parameter per occurrence of the gesture operation. The change operation screen includes the display of the step size. Therefore, since both the gesture operation and the display of the step size are enabled on the change operation screen, it is possible to change the autonomous driving control parameter at a small hardware cost.

The objects, features, aspects, and advantages of the present invention will become more apparent from the following detailed description and the accompanying drawings.

BRIEF DESCRIPTION OF DRAWINGS

FIG. 3 is a diagram of an example of a change operation screen according to the first embodiment.

FIG. 4 is a diagram of an example of the change operation screen according to the first embodiment.

DESCRIPTION OF EMBODIMENTS

A. First Embodiment

<A-1. Structure>

Figure 1:
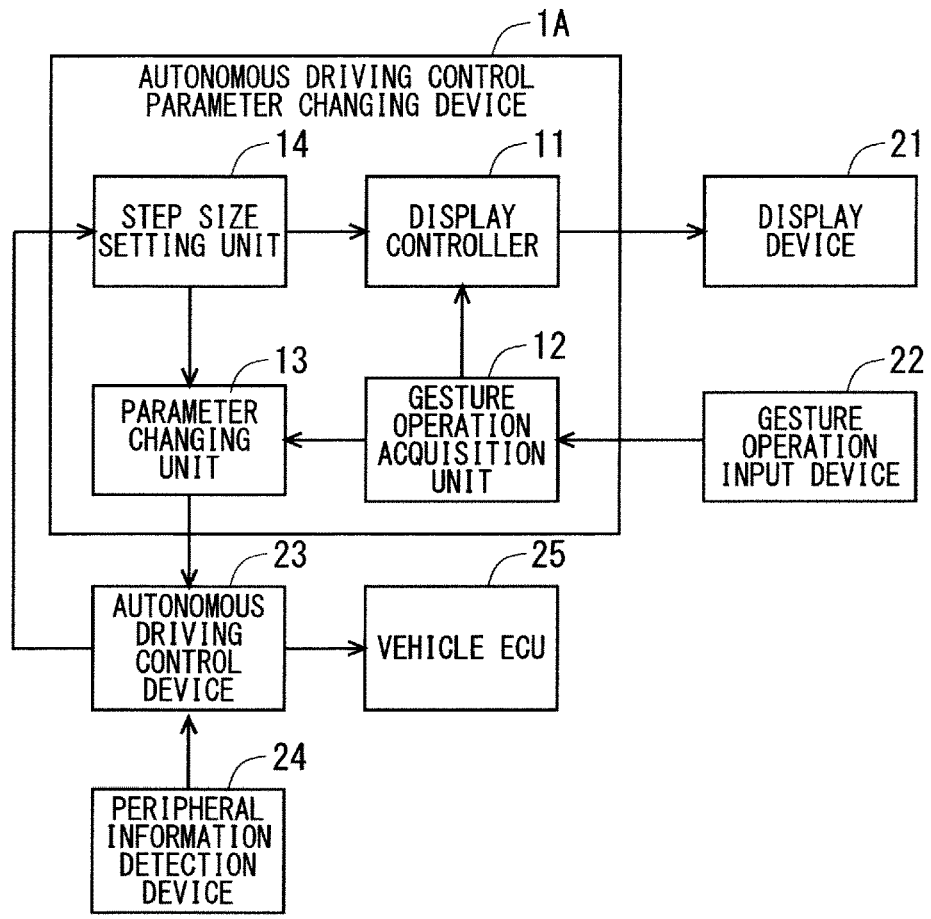
FIG. 1 is a block diagram of a structure of an autonomous driving control parameter changing device according to a first embodiment.

FIG. 1 is a block diagram of a structure of an autonomous driving control parameter changing device 1A according to a first embodiment of the present invention. Hereinafter, a vehicle under autonomous driving control performed by an autonomous driving control device 23 is referred to as "own vehicle" and is hence distinguished from the other vehicles.

The autonomous driving control parameter changing device 1A is configured as, for example, a device mounted on the own vehicle.

The autonomous driving control device 23 controls, based on peripheral information on the own vehicle acquired from a peripheral information detection device 24, a vehicle electronic control unit (ECU) 25 to perform autonomous driving control on the vehicle. The peripheral information includes, for example, an inter-vehicle distance between a nearby vehicle and the own vehicle, detection information on an obstacle, detection information on a white line, and the like, all of which are detected by various sensors mounted on the own vehicle.

The autonomous driving control device 23 has various parameters necessary for performing the autonomous driving control, and each of the parameters is referred to herein as an autonomous driving control parameter. Examples of the autonomous driving control parameter include a set speed under steady travel control, an inter-vehicle distance from a preceding vehicle under follow-up travel control, and a distance from a nearby vehicle or an obstacle under parking control, and the like.

The autonomous driving control parameter changing device 1A changes the autonomous driving control parameter as described above based on a gesture operation performed by a driver. The autonomous driving control parameter changing device 1A acquires the gesture operation from a gesture operation input device 22 mounted on the own vehicle. As the gesture operation input device 22, a touch panel formed integrally with a display device 21, a touch pad formed separately from the display device 21, a spatial gesture input device that detects a non-contact gesture operation, or the like is used.

A change operation screen on which the driver performs an operation for changing the autonomous driving control parameter is displayed on the display device 21 mounted on the own vehicle. The display device 21 is, for example, a liquid crystal panel. A description will be given below of the present invention where the gesture operation input device 22 serves as a touch panel. In this configuration, the gesture operation input device 22 and the display device 21 are integrally formed as a display with a touch panel.

FIG. 1 illustrates the display device 21, the gesture operation input device 22, and the autonomous driving control device 23 as devices connected to the autonomous driving control parameter changing device 1A, but the display device 21, the gesture operation input device 22, and the autonomous driving control device 23 may be internal components of the autonomous driving control parameter changing device 1A.

The autonomous driving control parameter changing device 1A includes a display control unit 11 that causes the display device 21 to display the change operation screen, a gesture operation acquisition unit 12, a parameter changing unit 13, and a step size setting unit 14. The gesture operation acquisition unit 12 acquires a gesture operation from the gesture operation input device 22 and outputs the gesture operation to the parameter changing unit 13. The parameter changing unit 13 acquires the autonomous driving control parameter from the autonomous driving control device 23 and the gesture operation from the gesture operation acquisition unit 12, changes the autonomous driving control parameter based on the gesture operation, and outputs the autonomous driving control parameter thus changed to the autonomous driving control device 23. A step size by which the parameter changing unit 13 changes the autonomous driving control parameter, that is, an amount of change in the autonomous driving control parameter per occurrence of the gesture operation is set by the step size setting unit 14.

<A-2. Operation>

Figure 2:
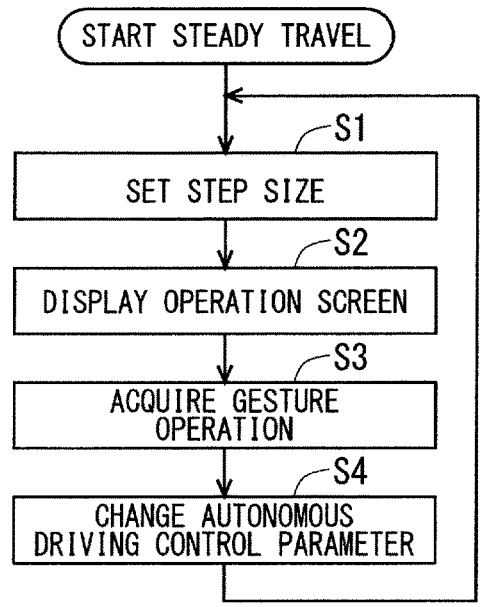
FIG. 2 is a flowchart of an operation of the autonomous driving control parameter changing device according to the first embodiment.

FIG. 2 is a flowchart of an operation of the autonomous driving control parameter changing device 1A, with a steady travel speed under the steady travel control taken as an example of the autonomous driving control parameter. A description will be given below of the operation of the autonomous driving control parameter changing device 1A with reference to FIG. 2.

First, when the own vehicle starts steady travel under control of the autonomous driving control device 23, the step size setting unit 14 sets the step size of the steady travel speed in accordance with various conditions (step S1). Here, the step size of the steady travel speed is set to 5 km.

Next, the display control unit 11 causes the display device 21 to display the change operation screen (step S2). FIG. 3 shows an example of the change operation screen displayed on the display device 21 in step S2. As shown in FIG. 3, on the change operation screen, an own vehicle icon 31 and a step size 32 set by the step size setting unit 14 are displayed. The own vehicle icon 31 displayed at a center of the change operation screen is an operation target icon to be operated by the driver for gesture operation. Further, since the step size 32 is denoted as "±5 km", the driver can grasp the step size before performing the gesture operation.

Next, the gesture operation acquisition unit 12 acquires the gesture operation from the gesture operation input device 22 (step S3). FIG. 4 shows a change operation screen where the driver performs a drag operation. As shown in FIG. 4, when the driver drags the own vehicle icon 31 upward, the gesture operation acquisition unit 12 acquires information on the drag operation. Here, the drag operation is an operation where the driver brings his or her finger into contact with the own vehicle icon 31 on the touch panel and then drags the finger along a touch surface of the touch panel, which is an example of the gesture operation.

The gesture operation acquisition unit 12 outputs the information on the drag operation acquired from the gesture operation input device 22 to the parameter changing unit 13, which causes the parameter changing unit 13 to change the autonomous driving control parameter (step S4). In the example shown in FIG. 4, since the own vehicle icon 31 is dragged upward, the parameter changing unit 13 increases the steady travel speed by the step size of 5 km. In the example shown in FIG. 4, the driver can drag the own vehicle icon 31 either upward or downward, and when the own vehicle icon 31 is dragged downward, the parameter changing unit 13 decreases the steady travel speed. As described above, each drag direction of the own vehicle icon 31 is pre-associated with a corresponding direction of changing the steady travel speed, that is, increasing or decreasing the steady travel speed, and the parameter changing unit 13 changes the steady travel speed in a direction corresponding to the drag direction in accordance with the association. The steady travel speed changed by the parameter changing unit 13 is output to the autonomous driving control device 23, and the autonomous driving control device 23 performs the steady travel control on the own vehicle in accordance with an updated steady travel speed.

Note that, in the above description, the drag operation has been described as an example of the gesture operation, but other gesture operations are applicable to the present invention as long as the operations are to move the own vehicle icon 31 in any of the directions. For example, a flick operation of flicking a finger in contact with the touch panel in any of the directions is also applicable to the present invention.

<A-3. Effect>

As described above, in the autonomous driving control parameter changing device 1A according to the first embodiment, the display control unit 11 causes the display device 21 to display the change operation screen of the autonomous driving control parameter, the gesture operation acquisition unit 12 acquires information on the gesture operation for moving the operation target icon in a predetermined direction, the parameter changing unit 13 changes the autonomous driving control parameter in an increase or decrease direction defined in association with a movement direction in which the operation target icon is moved by the gesture operation, the step size setting unit 14 variably sets the step size based on a predetermined condition, and the step size is displayed on the change operation screen. Accordingly, the driver can change the autonomous driving control parameter in a desired direction by the gesture operation. Further, since the step size of the autonomous driving control parameter is displayed on the change operation screen, the driver can grasp the step size. Further, the step size is displayed on the change operation screen on which the gesture operation is to be performed, which eliminates the need of providing a display device on which the step size is displayed separately from a device used for changing the autonomous driving control parameter and hence allows the number of pieces of hardware to be reduced.

B. Second Embodiment

An autonomous driving control parameter changing device according to a second embodiment of the present invention performs a process of changing a steady travel speed under steady travel control. The steady travel speed under the steady travel control is an example of the autonomous driving control parameter of the present invention. A structure of the autonomous driving control parameter changing device according to the second embodiment is similar to the structure in the first embodiment shown in FIG. 1; thus, a description will be given below of the autonomous driving control parameter changing device according to the second embodiment with the same reference numerals given to the same components as the components in the first embodiment.

<B-1. Process of Changing Steady Travel Speed>

Figure 5:
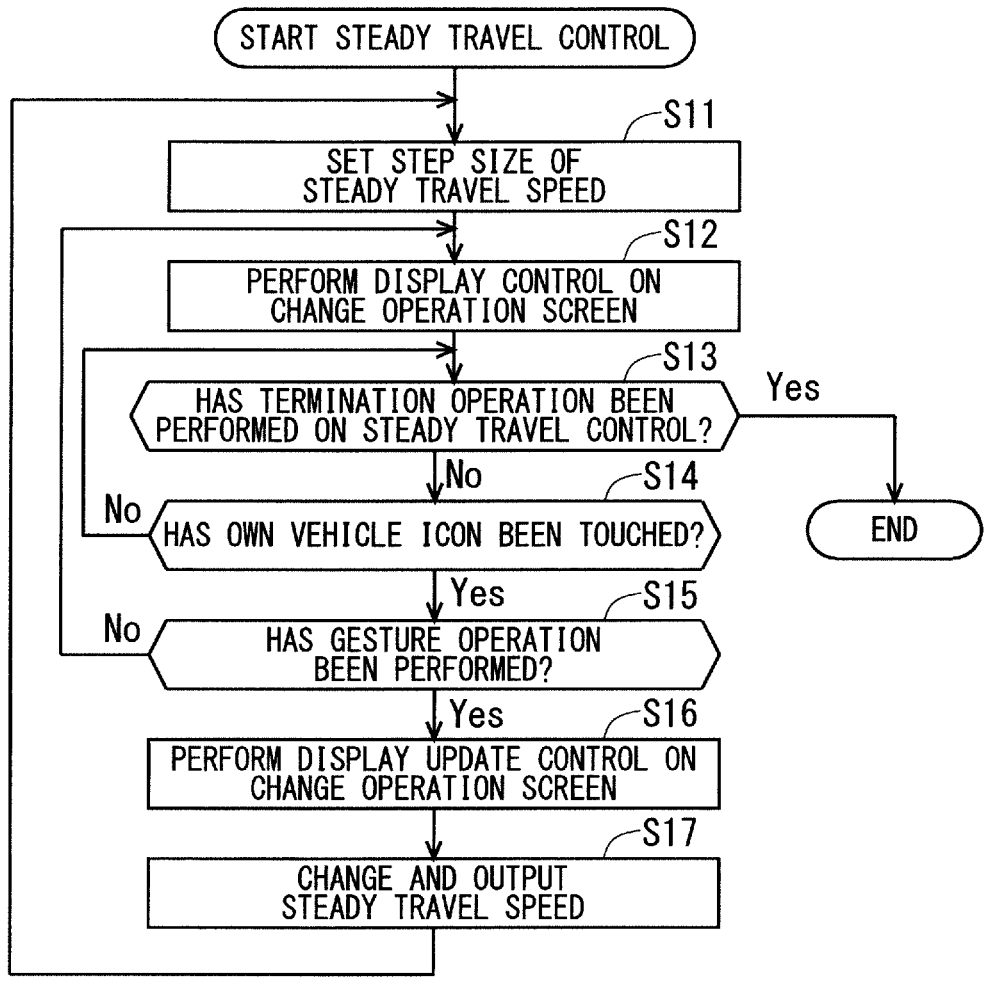
FIG. 5 is a flowchart of an operation of an autonomous driving control parameter changing device according to a second embodiment.

A description will be given below of the process of changing the steady travel speed under the steady travel control performed by an autonomous driving control parameter changing device 1A according to the second embodiment with reference to a flow shown in FIG. 5.

Figure 6:
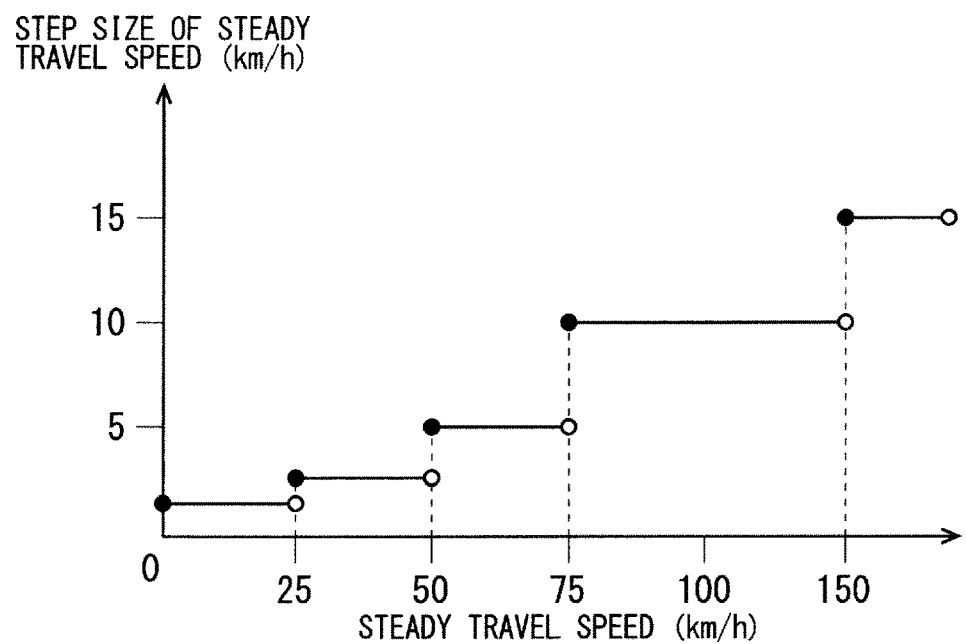
FIG. 6 is a diagram of a relation between a steady travel speed and a step size of the steady travel speed.

When an autonomous driving control device 23 starts the steady travel control of an own vehicle, a step size setting unit 14 sets a step size of the steady travel speed (step S11). In this step, the step size setting unit 14 acquires the steady travel speed of the vehicle from the autonomous driving control device 23, and sets the step size in accordance with an association shown in FIG. 6. In FIG. 6, a horizontal axis represents the steady travel speed (km/h), and a vertical axis represents the step size (km/h) of the steady travel speed. For example, when the steady travel speed is greater than or equal to 25 (km/h) and less than 50 (km/h), the step size is set to 4 (km/h), but when the steady travel speed is greater than or equal to 50 (km/h) and less than 75 (km/h), the step size is set to 5 (km/h). As described above, FIG. 6 shows that the step size gradually increases as the steady travel speed increases. Here, the steady travel speed is set to 55 (km/h), and the step size is set to 5 (km/h).

Figure 7:
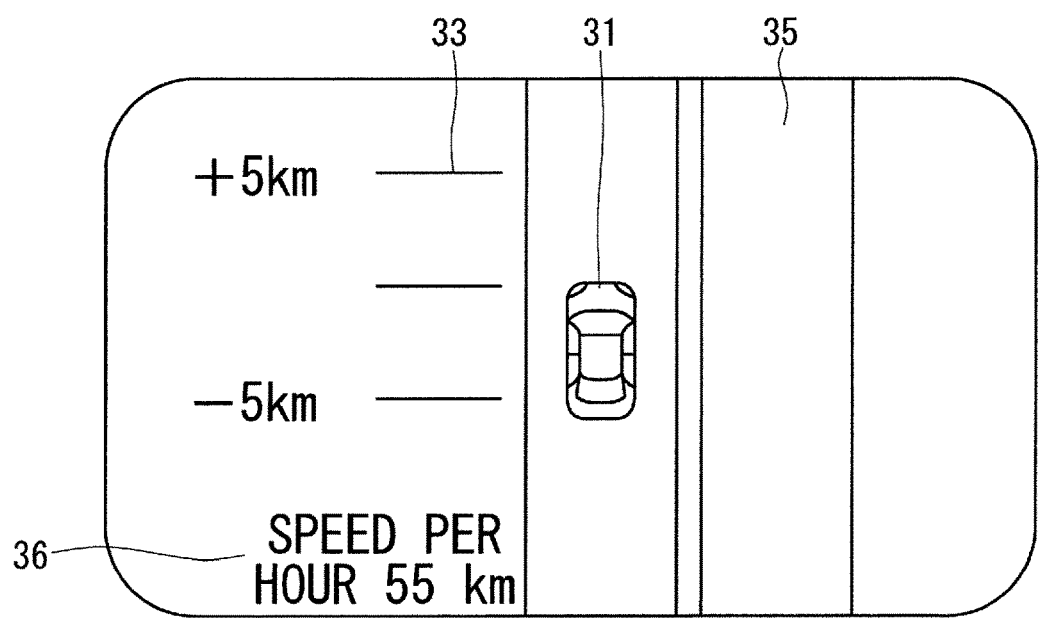
FIG. 7 is a diagram of an example of a change operation screen according to the second embodiment.

Next, a display control unit 11 performs display control on a change operation screen of the steady travel speed (hereinafter, simply referred to as "change operation screen") (step S12). FIG. 7 shows an example of the change operation screen displayed on a display device 21 in step S12. On the change operation screen, not only an own vehicle icon 31 that is an operation target icon, but also a road image 35 is displayed. A road indicated by the road image 35 extends in a vertical direction of the screen, and this direction coincides with a direction in which the own vehicle icon 31 is moved by a gesture operation. Further, the road image 35 indicates a road having two lanes that correspond to a number of lanes of a road on which the own vehicle is traveling. When the own vehicle is traveling on a left lane, the own vehicle icon 31 is displayed on a left lane in the road image 35 accordingly. When the own vehicle is traveling on a right lane, the own vehicle icon 31 is displayed on a right lane in the road image 35 accordingly. Further, when the number of lanes of the road on which the own vehicle is traveling is large, restrictions may be put on the number of lanes to be displayed in the road image 35. The number of lanes and a lane on which the own vehicle is traveling can be detected by an existing method such as image processing in which a white line is recognized, satellite positioning with high accuracy, or use of a map database storing lane number information. Further, graduations 33 of the step size are arranged corresponding to a movement region of the own vehicle icon 31 so that values on the graduations 33 indicated by the own vehicle icon 31 changes whenever the own vehicle icon 31 moves. A graduation 33 of "+5 km" is displayed above the own vehicle icon 31 and a graduation 33 of "−5 km" is displayed below the own vehicle icon 31. This display allows the driver to grasp that the step size of the steady travel speed is set to 5 km and in which of the upward and downward directions the driver should move the own vehicle icon 31 in order to increase or decrease the steady travel speed. Further, a current steady travel speed 36 is displayed on the change operation screen.

Next, the autonomous driving control parameter changing device 1A determines whether a termination operation has been performed on the steady travel control (step S13). The driver can input the termination operation on the steady travel control from an input device (not shown) to the autonomous driving control parameter changing device 1A. When the termination operation has been performed on the steady travel control, the autonomous driving control parameter changing device 1A terminates the process of changing the steady travel speed, and when no termination operation has been performed on the steady travel control, the flow proceeds to step S14.

Figure 8:
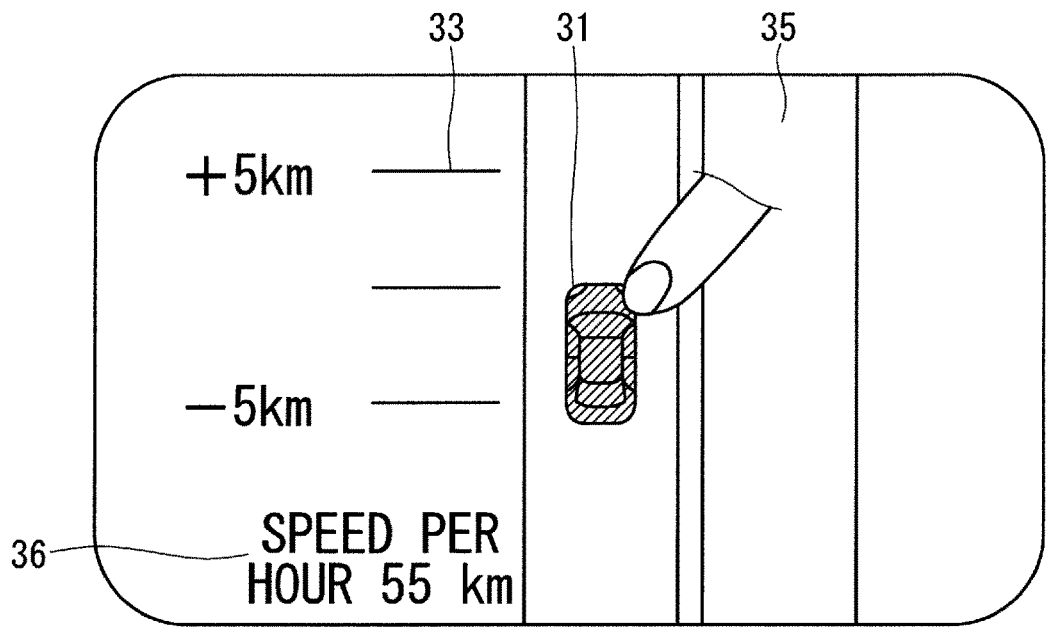
FIG. 8 is a diagram of an example of the change operation screen according to the second embodiment.

In step S14, a gesture operation acquisition unit 12 determines whether a touch operation has been performed on the own vehicle icon 31. When no touch operation has been performed on the own vehicle icon 31, the flow returns to step S13, and step S13 and step S14 are repeated until the touch operation is performed without terminating the steady travel control. When the touch operation has been performed on the own vehicle icon 31, the flow proceeds to step S15. Note that when the touch operation has been performed on the own vehicle icon 31, the display control unit 11 highlights the own vehicle icon 31 as shown in FIG. 8 to make it easy to visually recognize that the own vehicle icon 31 is being touched.

Next, the gesture operation acquisition unit 12 determines whether a gesture operation has been performed (step S15). When no gesture operation has been performed within a certain period of time from the touch operation performed on the own vehicle icon 31, the flow returns to step S12, and when the display control unit 11 has kept the display device 21 highlighting the own vehicle icon 31, the display control unit 11 returns the own vehicle icon 31 to a state where the own vehicle icon 31 is not highlighted. Here, the certain period of time is, for example, about 10 seconds. Further, when the driver continues the touch on the own vehicle icon 31 even after the certain period of time, in step S14 after returning from step S15 to step S12, it is determined to be No indicating that no additional touch has been performed on the new own vehicle icon 31.

On the other hand, when the gesture operation has been performed within the certain period of time from the touch operation performed on the own vehicle icon 31, the display control unit 11 performs display update control on the change operation screen based on the gesture operation (step S16). Specifically, the display control unit 11 changes a display position of the own vehicle icon 31 in accordance with the gesture operation, and changes a display mode of a graduation 33 displayed in a movement direction of the own vehicle icon 31.

Figure 9:
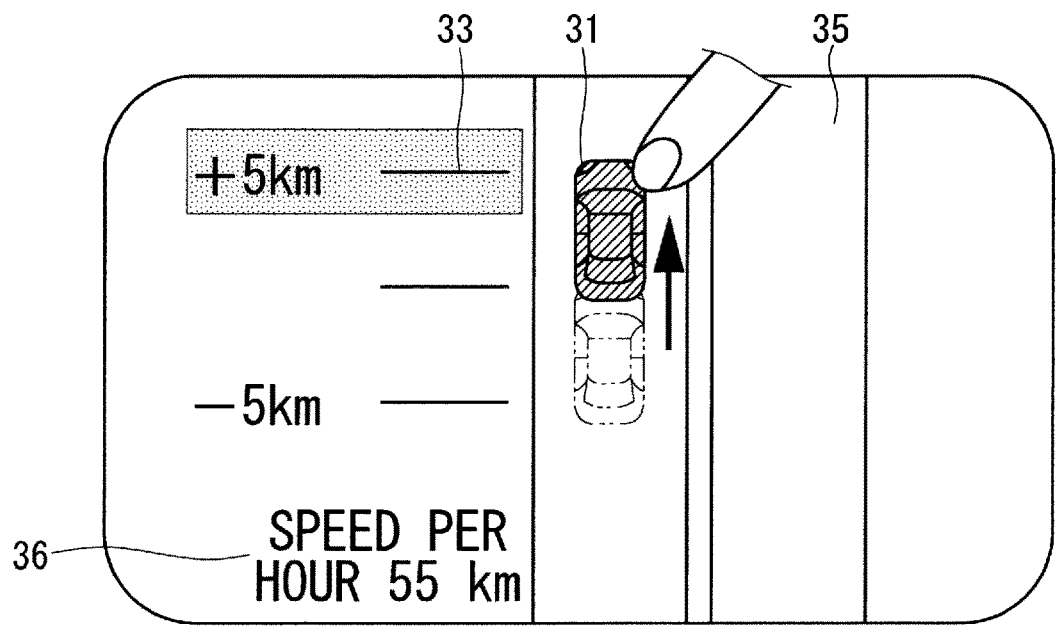
FIG. 9 is a diagram of an example of the change operation screen according to the second embodiment.

FIG. 9 shows a change operation screen displayed on the display device 21 in step S16. As shown in FIG. 9, dragging the own vehicle icon 31 upward moves the own vehicle icon 31 upward on the change operation screen, and the graduation 33 of "+5 km" is highlighted.

Next, a parameter changing unit 13 increases the steady travel speed by the step size of 5 (km/h) from current 55 (km/h) to 60 (km/h) and outputs the steady travel speed thus changed to the autonomous driving control device 23 (step S17).

Figure 10:
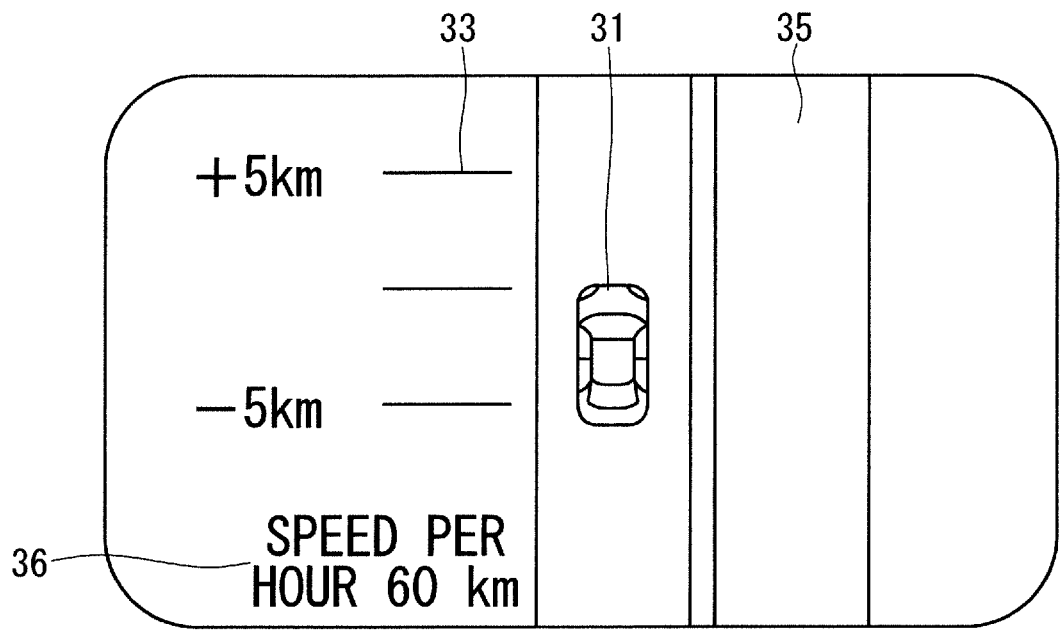
FIG. 10 is a diagram of an example of the change operation screen according to the second embodiment.

Next, the flow returns to step S11, the step size setting unit 14 updates the step size in accordance with the steady travel speed changed, based on a setting rule shown in FIG. 6. Then, the display control unit 11 performs display control on the change operation screen (step S12). FIG. 10 shows the change operation screen displayed on the display device 21. On the change operation screen shown in FIG. 10, the own vehicle icon 31 returns to an initial position, the highlighting of the own vehicle icon 31 is cleared, and the steady travel speed 36 is updated to "60 km/h".

As described with reference to FIGS. 7 to 10, the driver can increase the steady travel speed by the step size of 5 km by dragging the own vehicle icon 31 upward once. When desiring to increase the steady travel speed by 10 km, the driver may repeat the drag operation in the upward direction twice. Alternatively, when the flick operation is used, the driver may perform the flick operation in the upward direction twice. When the driver successively performs the flick operation in the same direction within a predetermined period of time, the parameter changing unit 13 may perform the process of changing the steady travel speed per flick operation, or may add up the step sizes each corresponding to one flick operation and change the steady travel speed by the value resulting from adding up the step sizes.

When the parameter changing unit 13 changes the steady travel speed by the value resulting from adding up the step sizes each corresponding to one flick operation, the step size setting unit 14 may set the step size for the second and subsequent flick operations smaller than the step size for the first flick operation. For example, when the flick operation is performed n times successively within the certain period of time, the step size setting unit 14 sets the step size for the first flick operation as X and the step size for an n flick operation as $X \cdot (\frac{1}{2})^{n-1}$. At this time, the value resulting from adding up the step sizes for n flick operations is represented by $X \cdot \Sigma (\frac{1}{2})^{k-1} | k=1$ to n. Thus, even when the flick operation is repeated a plurality of times successively, it is possible to prevent the steady travel speed from being greatly changed all at once. Note that the step size is not limited to the above expression, and it is sufficient if the step size for the second and subsequent flick operations is made smaller than the step size for the first flick operation. For example, the step size for the first flick operation may be X, the step size for the second and third flick operations may be X/2, and the step size for the fourth and subsequent flick operations may be X/4.

<B-2. Modification of Process of Changing Steady Travel Speed>

Figure 11:
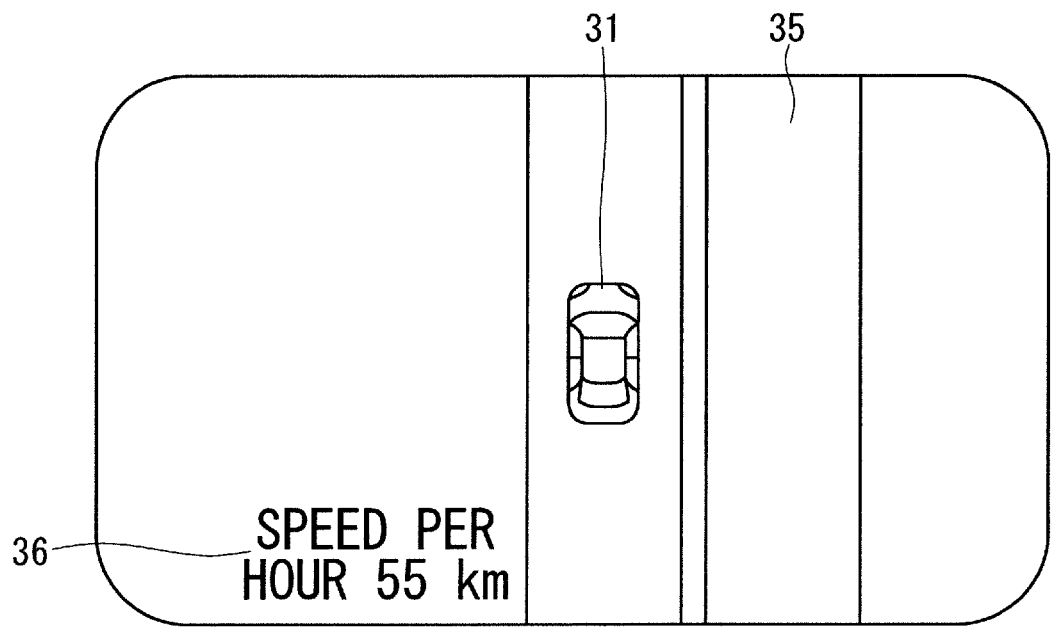
FIG. 11 is a diagram of an example of the change operation screen according to the second embodiment.

The graduations 33 of the step size are displayed before the own vehicle icon 31 is touched in FIG. 7, but, as shown in FIG. 11, the graduations 33 need not be displayed before the own vehicle icon 31 is touched. In this configuration, the graduations 33 are displayed when the own vehicle icon 31 is touched, and the display of the graduations 33 is cleared when the certain period of time has passed since the gesture operation. As described above, the graduations 33 of the step size are displayed only when the driver performs the operation of changing the autonomous driving control parameter, which allows the display of the change operation screen in a normal state to be simplified.

In the example shown in FIGS. 7 to 10, the step size setting unit 14 sets one step size in accordance with the steady travel speed, but a plurality of step sizes may be set. For example, when the steady travel speed is 55 (km/h), the step size setting unit 14 may set, as a first step size, the step size of 5 (km/h) set in accordance with the association shown in FIG. 6, and further set, as a second step size, the step size of 10 (km/h) that is twice the first step size. FIGS. 12 to 17 show change operation screens in a configuration where such two step sizes are set.

Figure 12:
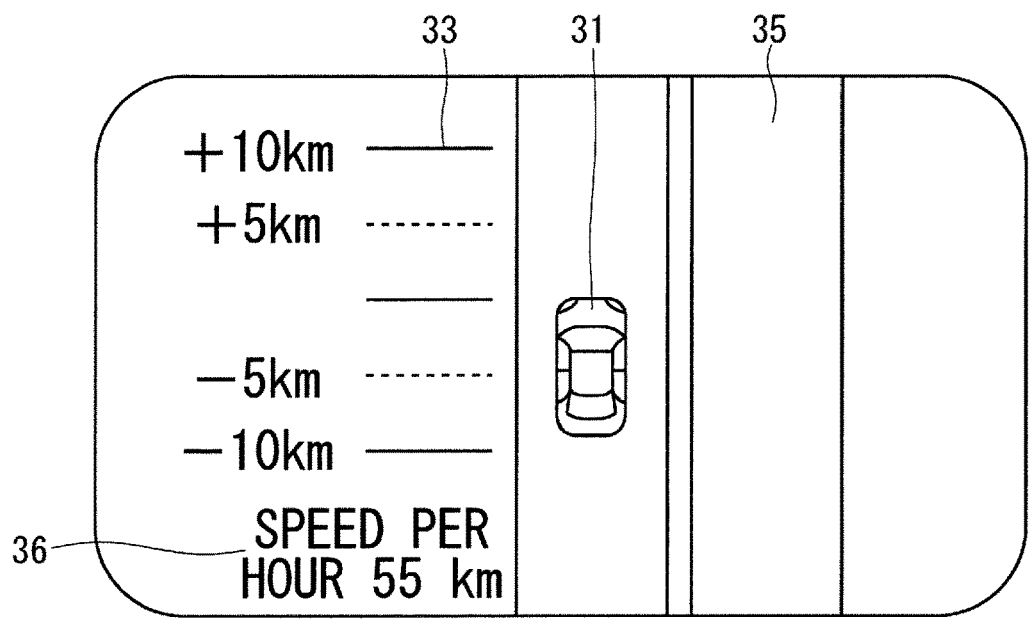
FIG. 12 is a diagram of an example of the change operation screen according to the second embodiment.

FIG. 12 shows a change operation screen displayed before the own vehicle icon 31 is touched in which graduations of 5 (km/h) and −5 (km/h) each corresponding to the first step size are displayed by broken lines, and graduations of 10 (km/h) and −10 (km/h) each corresponding to the second step size are displayed by solid lines. Further, the graduations of the second step size are displayed farther from the initial display position of the own vehicle icon 31 than the graduations of the first step size.

Figure 13:
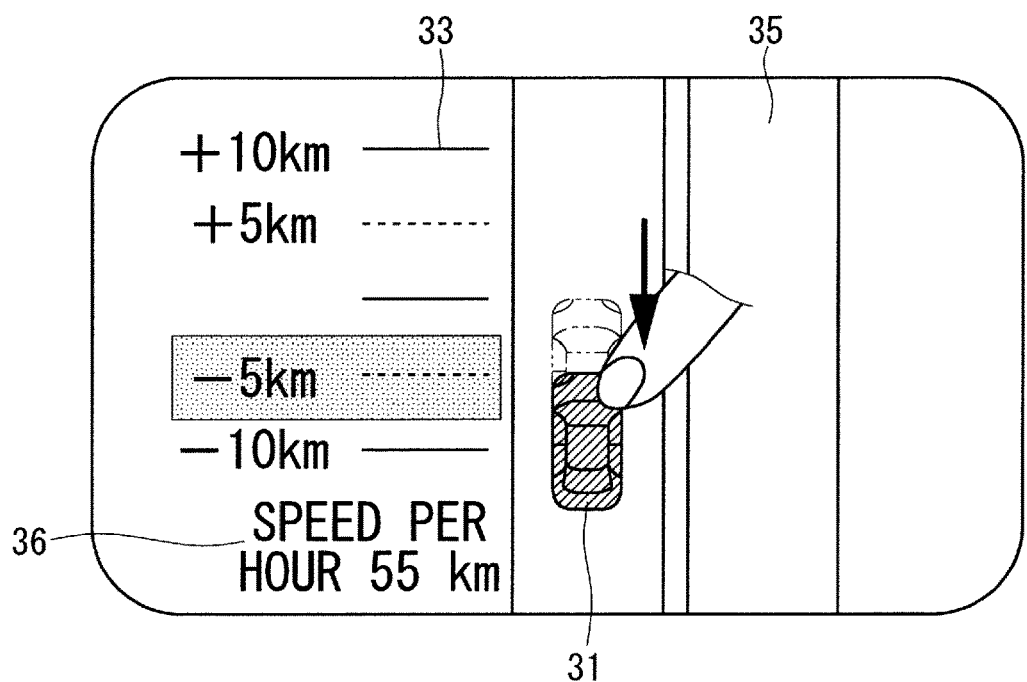
FIG. 13 is a diagram of an example of the change operation screen according to the second embodiment.

FIG. 13 shows a change operation screen in a state where the own vehicle icon 31 is dragged downward to a position of the graduation 33 of −5 km/h. At this time, a display color of the own vehicle icon 31 changes, and the graduation 33 of −5 (km/h) is highlighted. When the finger is released from the own vehicle icon 31 at this position, the steady travel speed is decreased by 5 (km/h) from 55 (km/h).

Figure 14:
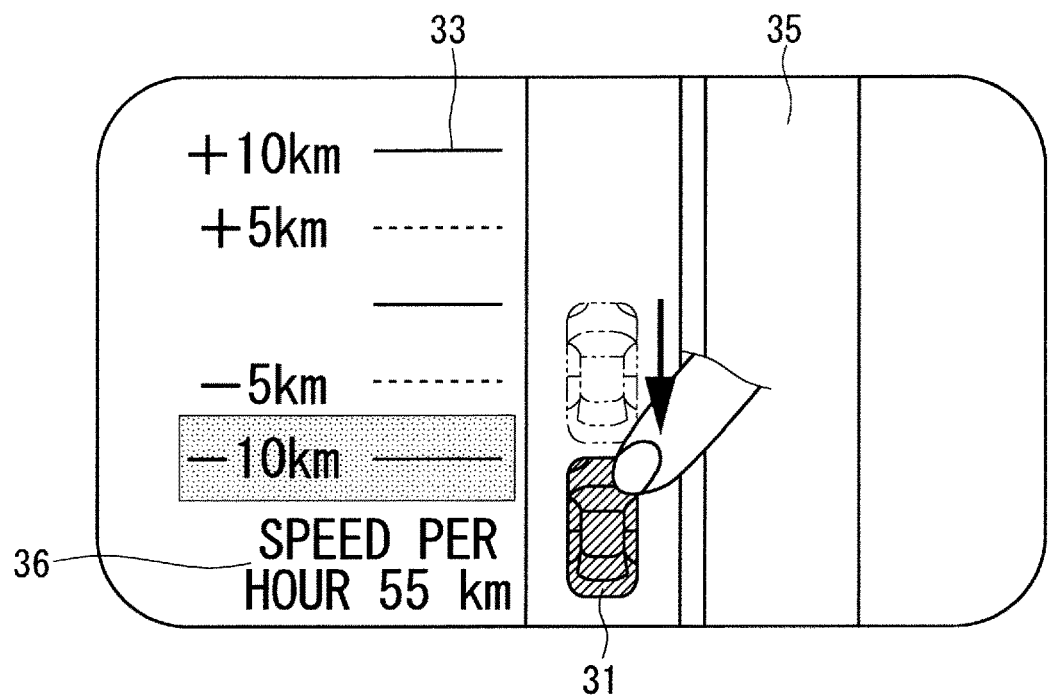
FIG. 14 is a diagram of an example of the change operation screen according to the second embodiment.

FIG. 14 shows a change operation screen in a state where the own vehicle icon 31 is dragged downward to a position of the graduation 33 of −10 km/h. At this time, the graduation 33 of −10 (km/h) is highlighted. When the finger is released from the own vehicle icon 31 at this position, the steady travel speed is decreased by 10 (km/h) from 55 (km/h). That is, the parameter changing unit 13 selects one from among the plurality of step sizes based on a drag amount of the drag operation, and changes the autonomous driving control parameter in accordance with the step size. Such a configuration where the plurality of step sizes are provided allows the step sizes to be selectively used, for example, when it is desired to change the steady travel speed to a large extent at once, the own vehicle icon 31 is dragged to a large extent, thereby causing a larger step size to be selected, and when it is desired to change the steady travel speed to a small extent, the own vehicle icon is dragged to a small extent, thereby causing a smaller step size to be selected. Note that even when the flick operation is used as the gesture operation, it is also possible to selectively use the step sizes by, for example, performing the flick operation strongly to select the larger step size and performing the flick operation weakly to select the smaller step size.

Figure 15:
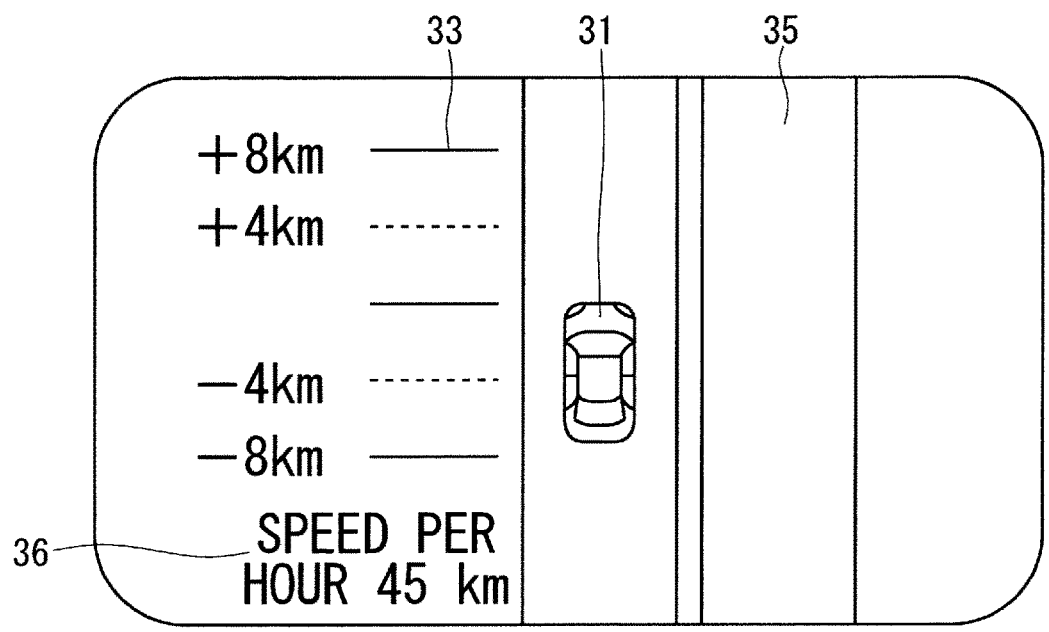
FIG. 15 is a diagram of an example of the change operation screen according to the second embodiment.

FIG. 15 shows a change operation screen after the drag operation shown in FIG. 14. The drag operation shown in FIG. 14 causes the steady travel speed to be 45 km/h. Accordingly, the first step size is changed to 4 (km/h) in accordance with the association shown in FIG. 6, and the second step size is changed to 8 (km/h) that is twice the first step size. Further, the steady travel speed 36 is displayed as "45 km/h".

Note that the second step size is not necessarily twice the first step size. As shown on the change operation screen of FIG. 16, the first step size may be 4 (km/h), and the second step size may be 10 (km/h). Further, the step size in the direction in which the steady travel speed increases and the step size in the direction in which the steady travel speed decreases need not be identical to each other, for example, the step size in the direction in which the steady travel speed decreases may be set smaller than the step size in the direction in which the steady travel speed increases.

Figure 17:
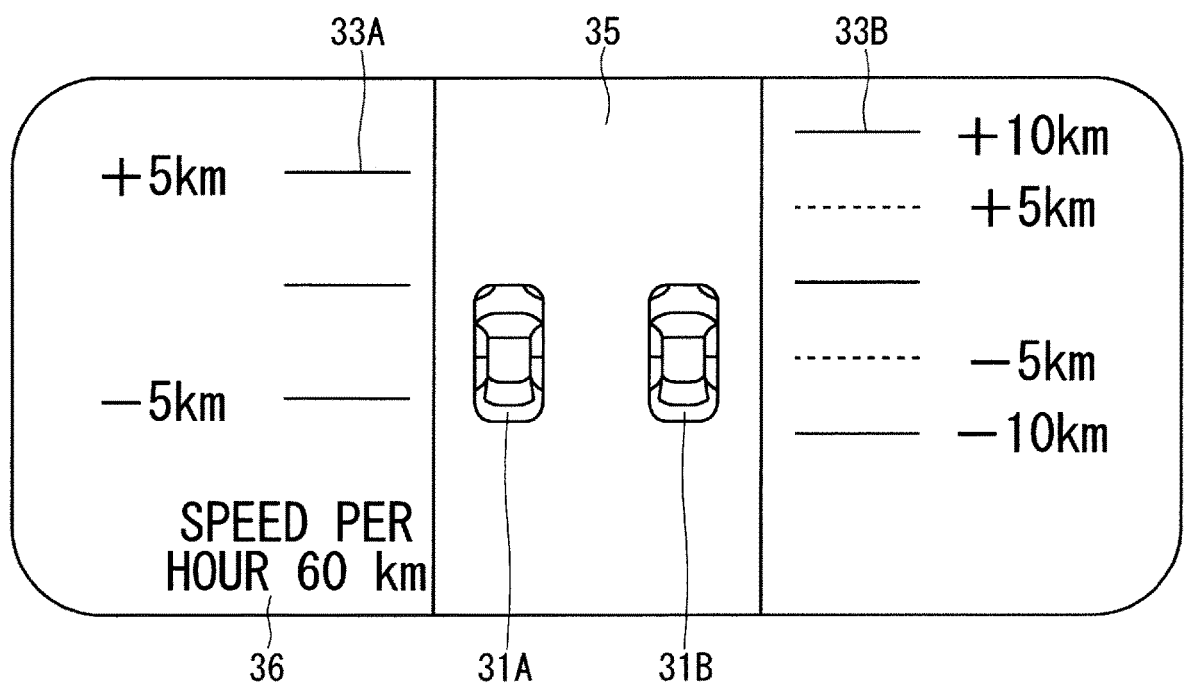
FIG. 17 is a diagram of an example of the change operation screen according to the second embodiment.

Further, as shown in FIG. 17, two own vehicle icons 31A, 31B may be displayed, graduations 33A of the first step size may be displayed adjacent to the own vehicle icon 31A, and graduations 33B of the first and second step sizes may be displayed adjacent to the own vehicle icon 31B. The own vehicle icon 31A may be an icon for flick operation, and the own vehicle icon 31B may be an icon for drag operation. Such a configuration allows the own vehicle icons 31A, 31B to be selectively used, for example, when desiring to simply change the steady travel speed, the driver performs the flick operation on the own vehicle icon 31A, and when desiring to select the step size of the steady travel speed by himself or herself, the driver performs the drag operation on the own vehicle icon 31B.

Further, in FIG. 17, only graduations of +10 km and −10 km each corresponding to the second step size may be displayed adjacent to the own vehicle icon 31B, and both the own vehicle icon 31A and the own vehicle icon 31 may serve as icons for flick operation. In this configuration, the driver can make a change in 5 km steps by performing the flick operation on the left own vehicle icon 31A and can make a change in 10 km steps by performing the flick operation on the right own vehicle icon 31B.

In the above description, the touch panel is used as the gesture operation input device 22, but a touch pad may be used. A configuration where the touch pad is used allows a touch on any position of the touch pad to be determined that the own vehicle icon 31 has been touched, which makes it possible to shorten the operation time and improve the accuracy of the operation.

C. Third Embodiment

An autonomous driving control parameter changing device according to a third embodiment of the present invention performs a process of changing an inter-vehicle distance from a preceding vehicle under follow-up travel control. The follow-up travel control refers to travel control under which the inter-vehicle distance from the preceding vehicle traveling in front of an own vehicle is made constant. The inter-vehicle distance from the preceding vehicle under the follow-up travel control is an example of the autonomous driving control parameter of the present invention. A structure of the autonomous driving control parameter changing device according to the third embodiment is similar to the structure in the first embodiment shown in FIG. 1; thus, a description will be given below of the autonomous driving control parameter changing device according to the third embodiment with the same reference numerals given to the same components as the components in the first embodiment.

<C-1. Process of Changing Inter-Vehicle Distance>

Figure 18:
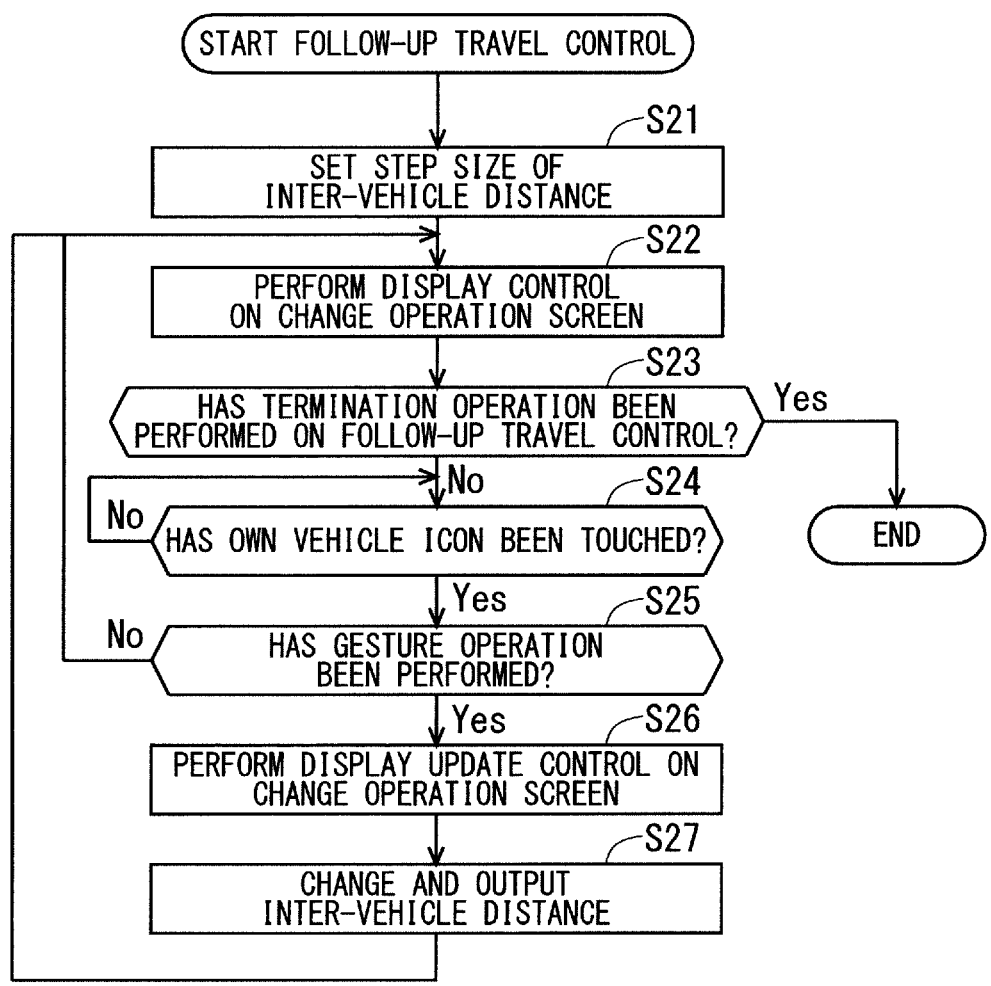
FIG. 18 is a flowchart of an operation of an autonomous driving control parameter changing device according to a third embodiment.

A description will be given below of the process of changing the inter-vehicle distance from the preceding vehicle (hereinafter, simply referred to as "inter-vehicle distance") under the follow-up travel control performed by an autonomous driving control parameter changing device 1A according to the third embodiment with reference to the flow shown in FIG. 18.

Figure 19:
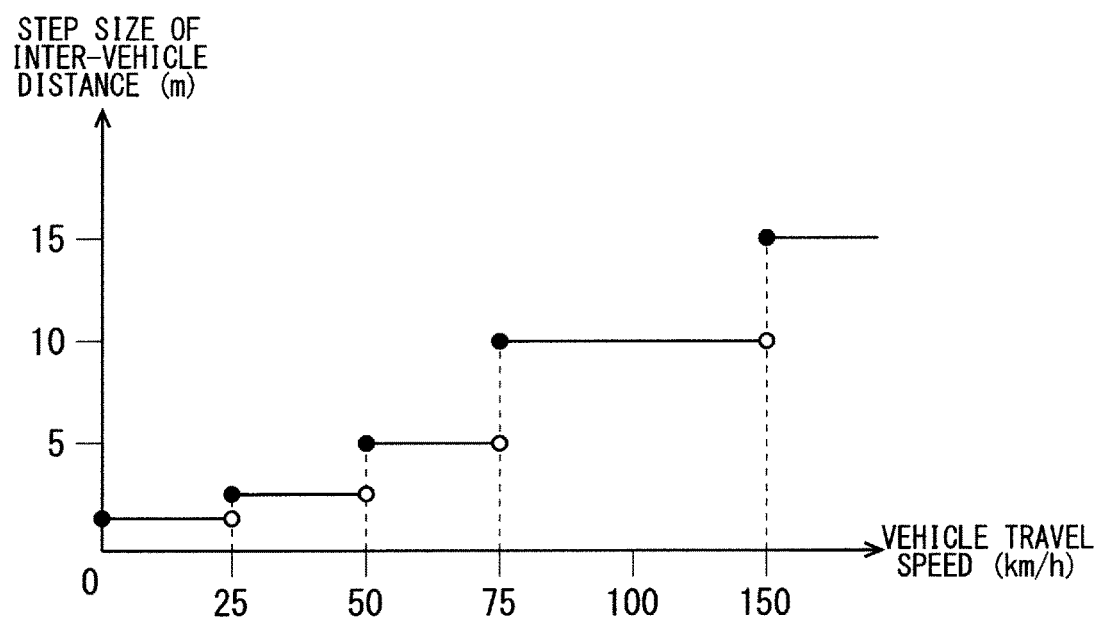
FIG. 19 is a diagram of a relation between a travel speed of a vehicle and a step size of an inter-vehicle distance.

When an autonomous driving control device 23 starts the follow-up travel control of the own vehicle, a step size setting unit 14 sets a step size of the inter-vehicle distance (step S21). In this step, the step size setting unit 14 acquires a travel speed of the own vehicle from the autonomous driving control device 23 or a peripheral information detection device 24, and sets the step size of the inter-vehicle distance in accordance with an association shown in FIG. 19. In FIG. 19, a horizontal axis represents the travel speed (km/h) of the vehicle, and a vertical axis represents the step size (m) of the inter-vehicle distance. For example, when the travel speed is greater than or equal to 50 (km/h) and less than 75 (km/h), the step size of the inter-vehicle distance is set to 5 (m), but the travel speed is greater than or equal to 75 (km/h) and less than 150 (km/h), the step size of the inter-vehicle distance is set to 10 (m). As described above, FIG. 19 shows that the step size of the inter-vehicle distance gradually increases as the travel speed increases. Here, the travel speed is set to 80 (km/h), and the step size of the inter-vehicle distance is set to 10 (m).

Figure 20:
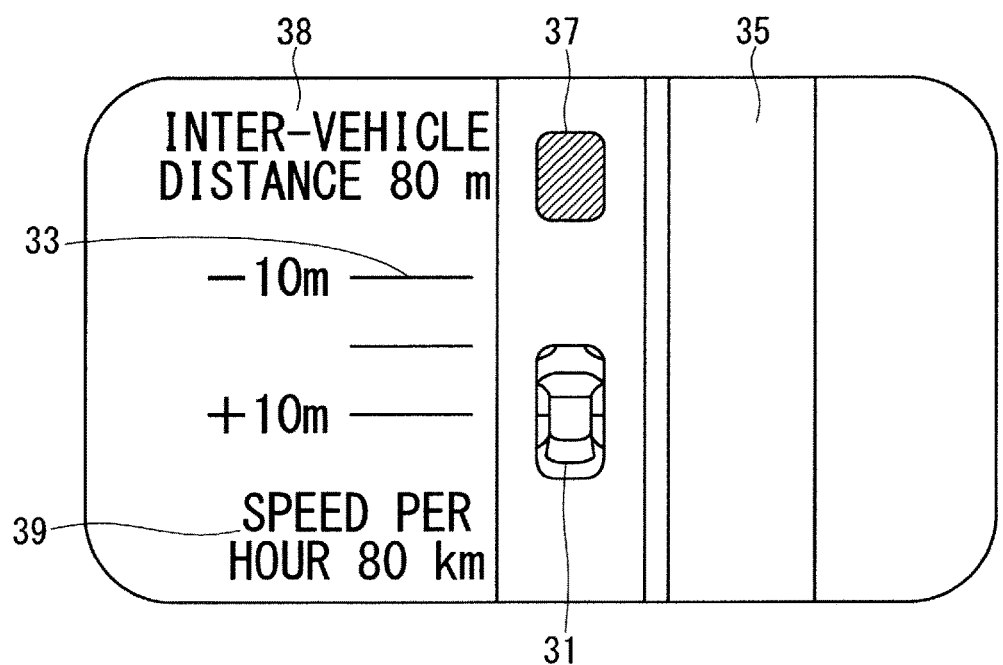
FIG. 20 is a diagram of an example of a change operation screen according to the third embodiment.

Next, a display control unit 11 performs display control on a change operation screen of the inter-vehicle distance (hereinafter, simply referred to as "change operation screen") (step S22). FIG. 20 shows an example of the change operation screen displayed on a display device 21 in step S22. On this change operation screen, as in the second embodiment, not only an own vehicle icon 31 that is an operation target icon, but also a road image 35 and graduations 33 of the step size are displayed. A graduation 33 of "−10 m" is displayed above the own vehicle icon 31, and a graduation 33 of "+10 m" is displayed below the own vehicle icon 31. This display allows the driver to grasp that the step size of the inter-vehicle distance is 10 m, moving the own vehicle icon upward decreases the inter-vehicle distance, and moving the own vehicle icon downward increases the inter-vehicle distance. Further, on the change operation screen, a current vehicle travel speed 39, a preceding vehicle icon 37, and an inter-vehicle distance 38 are displayed. The preceding vehicle icon 37 is displayed above the own vehicle icon 31 on the road image 35, which reflects a positional relation between the preceding vehicle and the own vehicle. Note that details of the display position of the preceding vehicle icon 37 will be described later.

Next, the autonomous driving control parameter changing device 1A determines whether a termination operation has been performed on the follow-up travel control (step S23). The driver can input the termination operation on the follow-up travel control from an input device (not shown) to the autonomous driving control parameter changing device 1A. When the termination operation has been performed on the follow-up travel control, the autonomous driving control parameter changing device 1A terminates the process of changing the inter-vehicle distance, and when no termination operation has been performed on the follow-up travel control, the flow proceeds to step S24.

Figure 21:
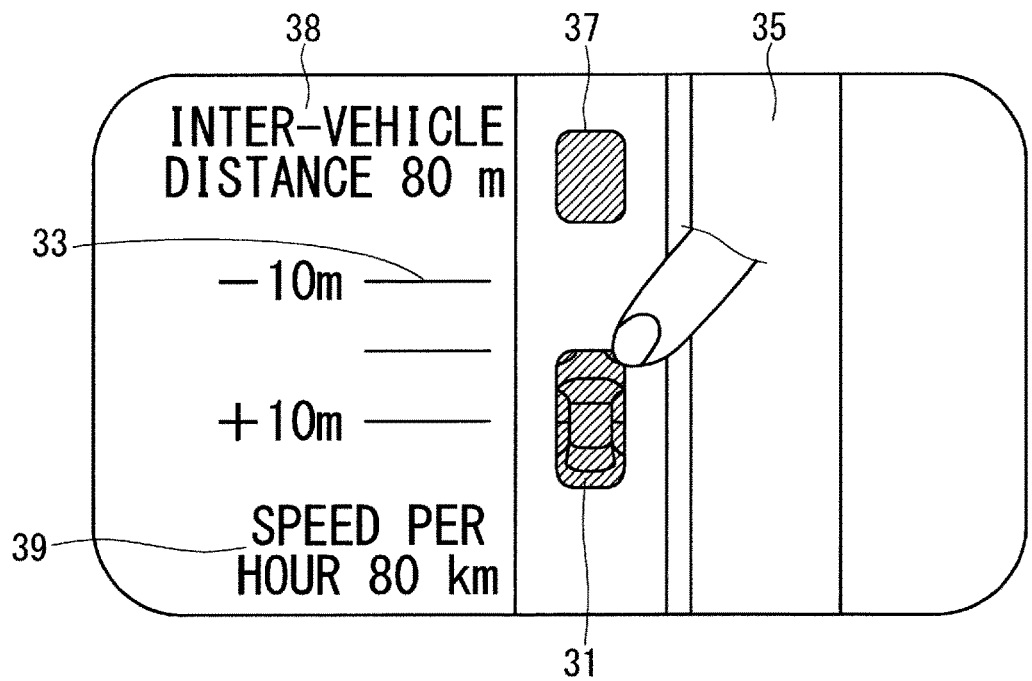
FIG. 21 is a diagram of an example of the change operation screen according to the third embodiment.

In step S24, a gesture operation acquisition unit 12 determines whether a touch operation has been performed on the own vehicle icon 31. When no touch operation has been performed on the own vehicle icon 31, step S24 is repeated until the touch operation is performed, and when the touch operation has been performed, the flow proceeds to step S25. Note that when the touch operation has been performed on the own vehicle icon 31, the display control unit 11 highlights the own vehicle icon 31 as shown in FIG. 21 to make it easy to visually recognize that the own vehicle icon 31 is being touched.

Next, the gesture operation acquisition unit 12 determines whether a gesture operation has been performed (step S25). When no gesture operation has been performed within a certain period of time from the touch operation performed on the own vehicle icon 31, the flow returns to step S22. When the display control unit 11 has highlighted the own vehicle icon 31, the display control unit 11 returns the own vehicle icon 31 to an original state.

On the other hand, when the gesture operation has been performed within the certain period of time from the touch operation performed on the own vehicle icon 31, the display control unit 11 performs display update control on the change operation screen based on the gesture operation (step S26). Specifically, the display control unit 11 changes a display position of the own vehicle icon 31 in accordance with the gesture operation, and changes a display mode of a graduation 33 displayed in a movement direction of the own vehicle icon 31.

Figure 22:
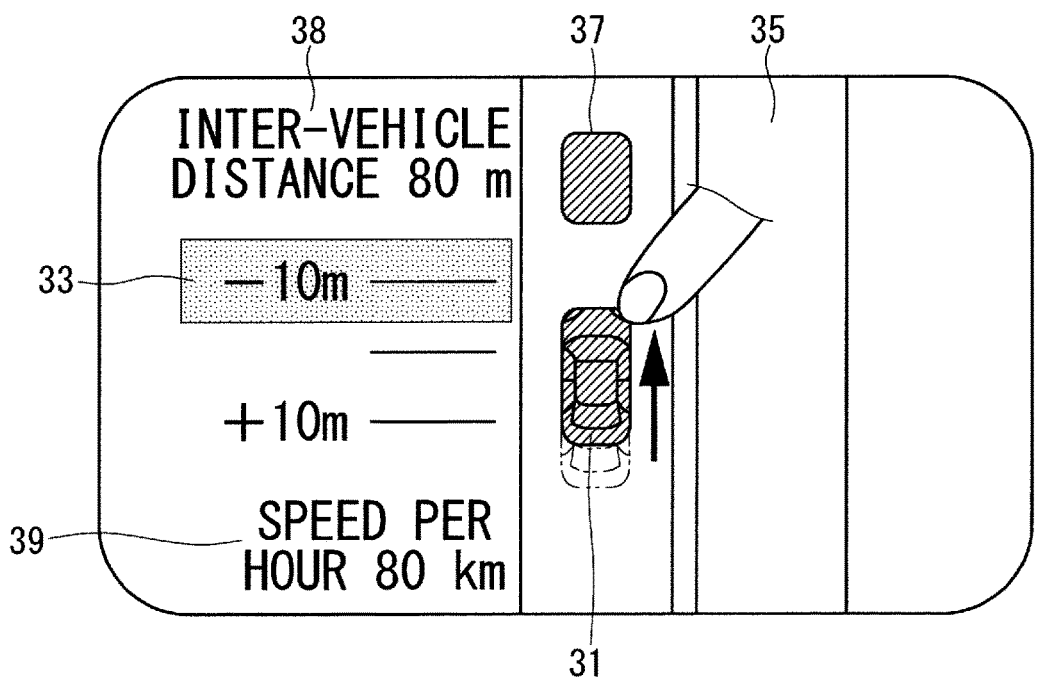
FIG. 22 is a diagram of an example of the change operation screen according to the third embodiment.

FIG. 22 shows a change operation screen displayed on the display device 21 in step S26. As shown in FIG. 22, dragging the own vehicle icon 31 upward moves the own vehicle icon 31 upward on the change operation screen, and further the graduation 33 of "−10 km" is highlighted.

Next, a parameter changing unit 13 decreases the inter-vehicle distance by the step size of 10 m from current 80 m to 70 m and outputs the inter-vehicle distance thus changed to the autonomous driving control device 23 (step S27).

Figure 23:
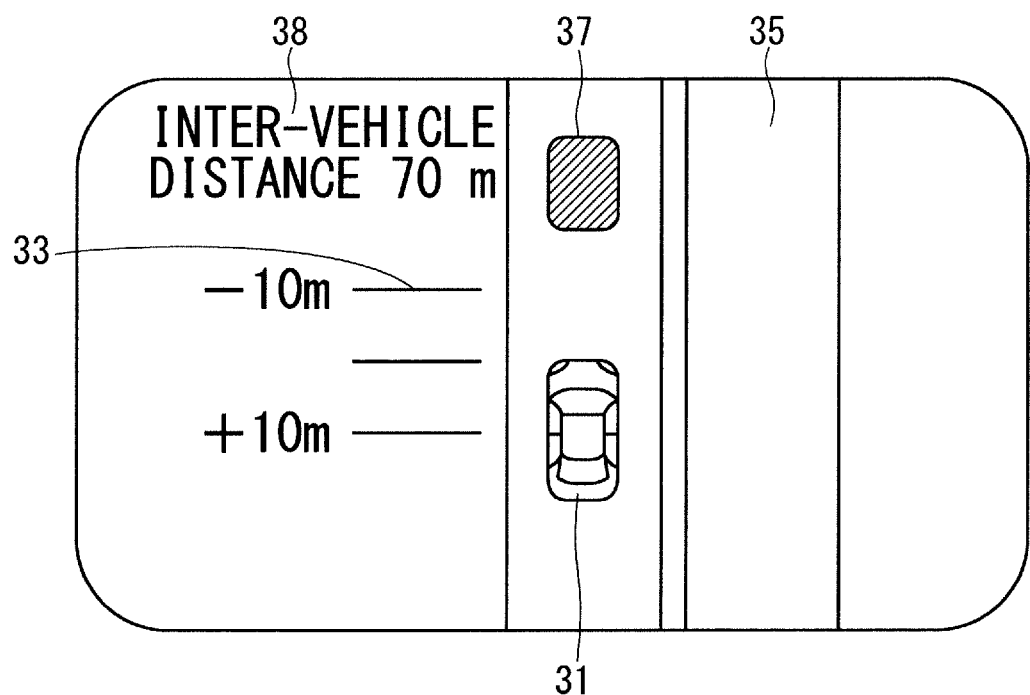
FIG. 23 is a diagram of an example of the change operation screen according to the third embodiment.

Next, the flow returns to step S22, and the display control unit 11 performs display control on the change operation screen. FIG. 23 shows the change operation screen displayed on the display device 21. On the change operation screen shown in FIG. 23, the own vehicle icon 31 returns to an initial position, the highlighting of the own vehicle icon 31 is cleared, and the inter-vehicle distance 38 is updated to "70 m". Here is the end of the process of changing the inter-vehicle distance performed by the autonomous driving control parameter changing device 1A.

Figure 24:
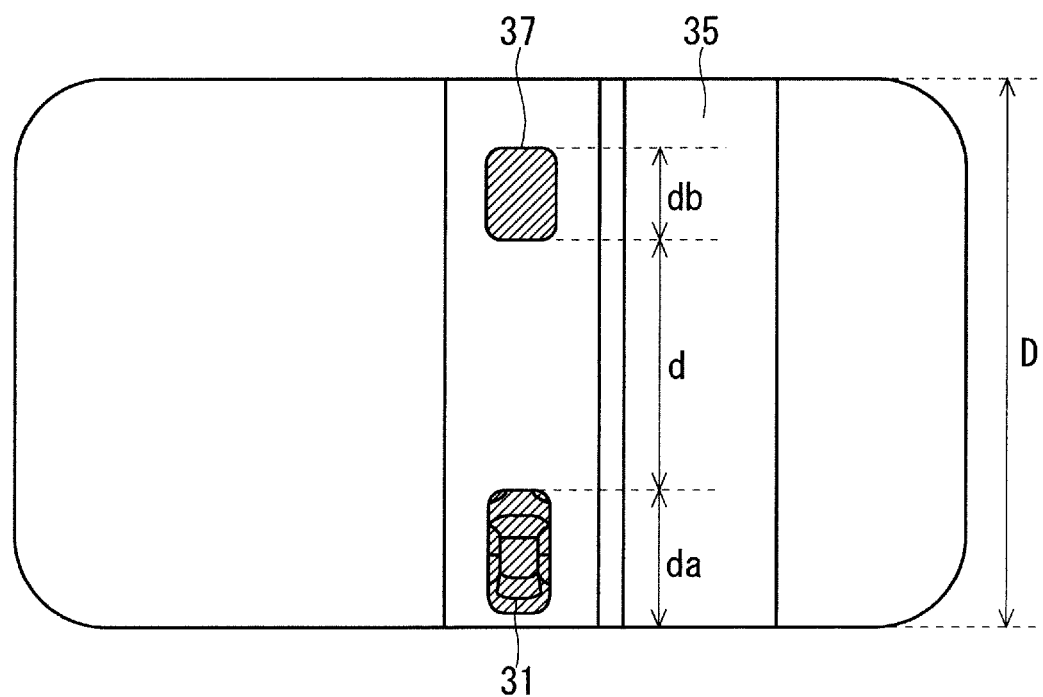
FIG. 24 is a diagram of a positional relation between a preceding vehicle icon and an own vehicle icon on the change operation screen according to the third embodiment.
Figure 25:
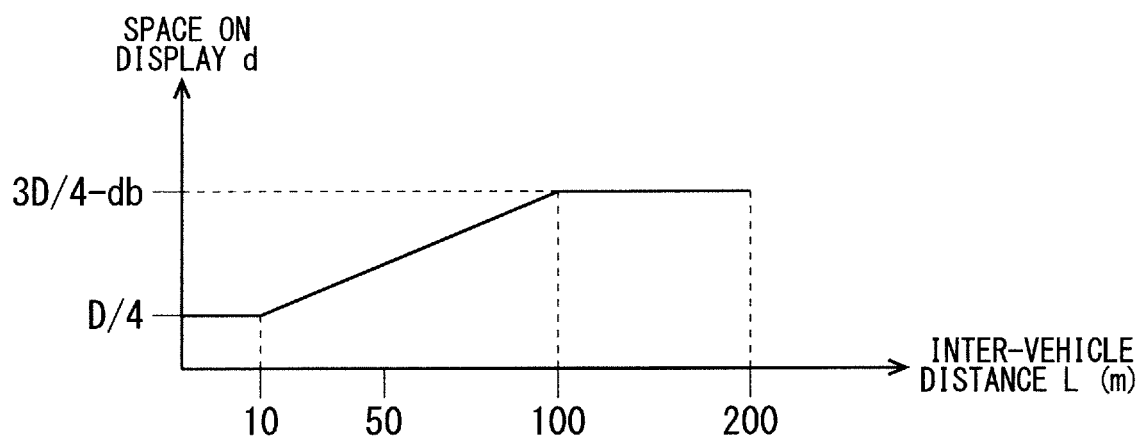
FIG. 25 is a diagram of a relation between a space on display between the preceding vehicle icon and the own vehicle icon and the inter-vehicle distance.

Next, a description will be given of the display position of the preceding vehicle icon 37. On the change operation screen, the preceding vehicle icon 37 is displayed above the own vehicle icon 31. Then, a space on display between both the icons reflects an actual inter-vehicle distance between the own vehicle and the preceding vehicle. As shown in FIG. 24, a distance in a vertical direction of the change operation screen is denoted by D, the space on display between the preceding vehicle icon 37 and the own vehicle icon 31 is denoted by d, a distance from a position where a head of the own vehicle icon 31 is displayed to a lower end of the change operation screen is denoted by da=D/4, and a vertical length of the preceding vehicle icon 37 is denoted by db. FIG. 25 shows a relation between the actual inter-vehicle distance L (m) and the space on display d to be set.

As shown in FIG. 25, when the inter-vehicle distance is short ($0 \leq L < 10$), the space on display d is constant at the smallest value D/4. Although the space on display d is the smallest at this time, the preceding vehicle icon 37 is displayed at a position in an upper half of the change operation screen, which allows a movement region of the own vehicle icon 31 to be secured. Further, when the inter-vehicle distance is long to some extent ($10 \leq L < 100$), the space on display d reflects the inter-vehicle distance L, and as the inter-vehicle distance increases, the space on display d increases at a constant ratio from the smallest value D/4 to the largest value 3D/4−db. When the inter-vehicle distance is long ($100 \leq L < 200$), the space on display d is constant at the largest value 3D/4−db. At this time, the preceding vehicle icon 37 is displayed at a position as close as possible to an upper end of the change operation screen. In FIG. 25, when the inter-vehicle distance is extremely long ($L > 200$) the space on display d is not shown, and in such a case, the preceding vehicle icon 37 is not displayed.

The display control unit 11 acquires, from the step size setting unit 14, the inter-vehicle distance from the preceding vehicle, and determines the space on display d between the preceding vehicle icon 37 and the own vehicle icon 31 based on the inter-vehicle distance as described above.

<C-2. Modification>

Figure 26:
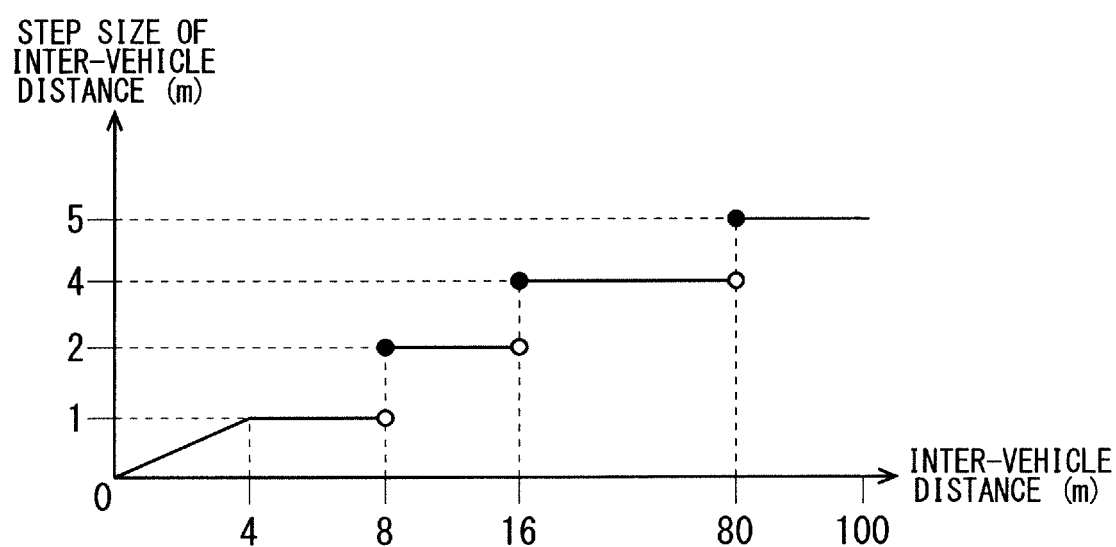
FIG. 26 is a diagram of a relation between the inter-vehicle distance and the step size of the inter-vehicle distance.

In the above description, the step size setting unit 14 sets the step size of the inter-vehicle distance in accordance with the travel speed of the own vehicle, but may set the step size of the inter-vehicle distance in accordance with the inter-vehicle distance between the preceding vehicle and the own vehicle (hereinafter, simply referred to as "inter-vehicle distance"). In this configuration, the step size setting unit 14 acquires the inter-vehicle distance from the autonomous driving control device 23 or the peripheral information detection device 24. In FIG. 26, a horizontal axis represents the inter-vehicle distance (m), a vertical axis represents the step size of the inter-vehicle distance (m), and an association between the inter-vehicle distance and the step size of the inter-vehicle distance is shown. In FIG. 26, the step size of the inter-vehicle distance is 1 m when the inter-vehicle distance is greater than or equal to 4 m and less than 8 m, and the step size of the inter-vehicle distance is 2 m when the inter-vehicle distance is greater than or equal to 8 m and less than 16 m, that is, the step size of the inter-vehicle distance gradually increases as the inter-vehicle distance increases. The step size setting unit 14 is capable of setting the step size of the inter-vehicle distance in accordance with the inter-vehicle distance based on the association as shown in FIG. 26.

Alternatively, the step size setting unit 14 may set the step size of the inter-vehicle distance based on both the travel speed of the own vehicle and the inter-vehicle distance. For example, the step size setting unit 14 may compare the step size of the inter-vehicle distance based on the travel speed with the step size of the inter-vehicle distance based on the inter-vehicle distance to select a smaller step size, or may set an average value of the two to the step size.

Figure 27:
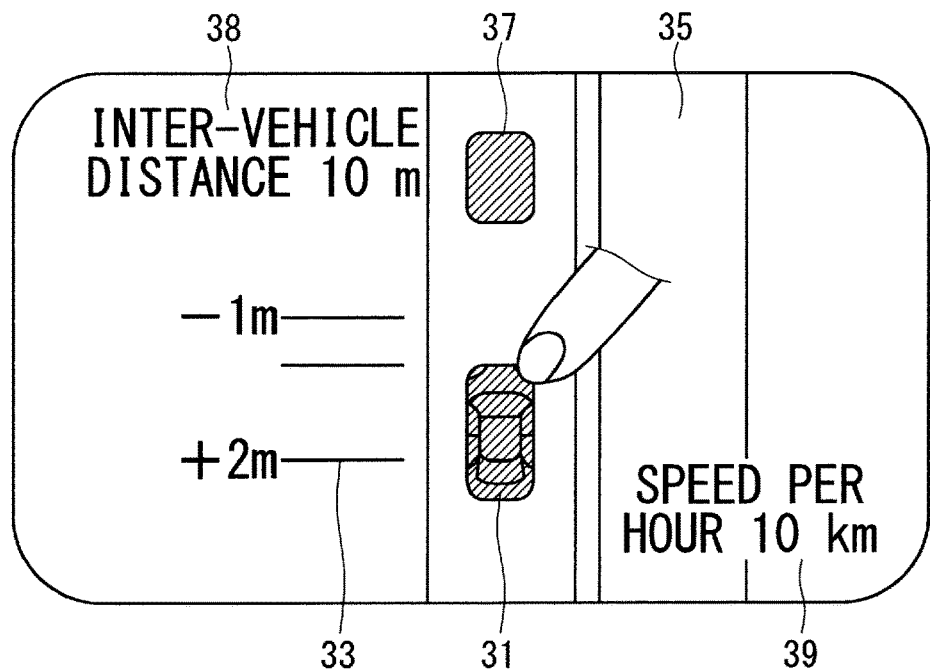
FIG. 27 is a diagram of an example of the change operation screen according to the third embodiment.

Further, the step size setting unit 14 may set step sizes different for each of an increase and decrease directions of the inter-vehicle distance. For example, the step size setting unit 14 sets a step size for the decrease direction of the inter-vehicle distance smaller than a step size for the increase direction. FIG. 27 shows a change operation screen according to this modification. In FIG. 27, the inter-vehicle distance is 10 m. In accordance with the association shown in FIG. 26, the step size setting unit 14 sets the step size for the increase direction of the inter-vehicle distance to 2 m.

Accordingly, a graduation 33 of "+2 m" is displayed below the own vehicle icon 31. On the other hand, the step size setting unit 14 sets the step size for the decrease direction of the inter-vehicle distance to 1 m that is a half of the step size for the increase direction. Accordingly, a graduation 33 of "−1 m" is displayed above the own vehicle icon 31. This allows the driver to carefully decrease the inter-vehicle distance.

Figure 28:
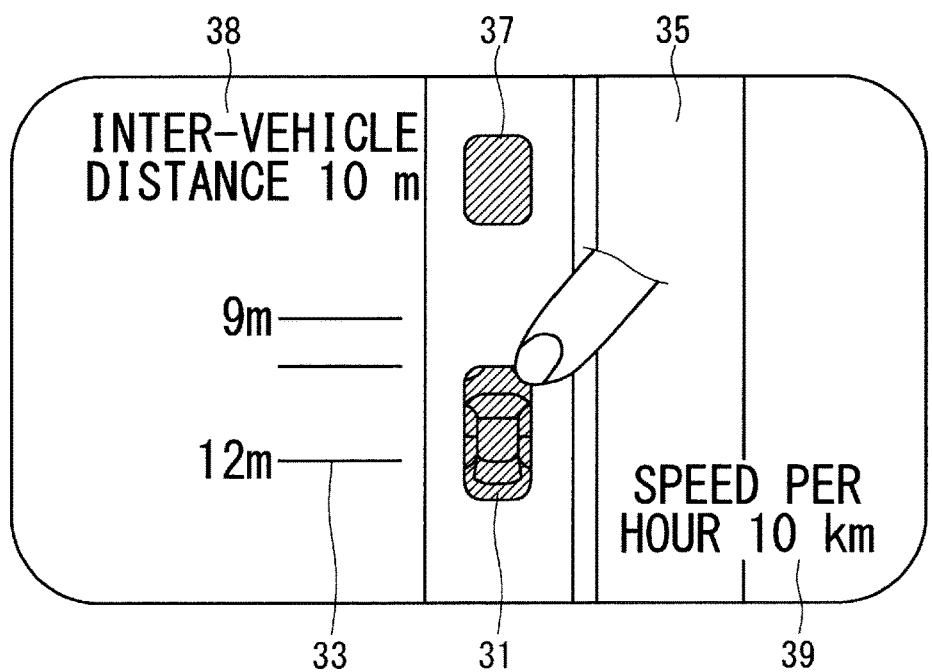
FIG. 28 is a diagram of an example of the change operation screen according to the third embodiment.

Further, on the change operation screen shown in FIG. 27, a step size of "−1 m" or "+2 m" is displayed on a label of the graduations 33 of the step size, but as shown in FIG. 28, "9 m" or "12 m that is a result of changing the inter-vehicle distance by the step size may be displayed on the label of the graduations 33 of the step size.

Figure 29:
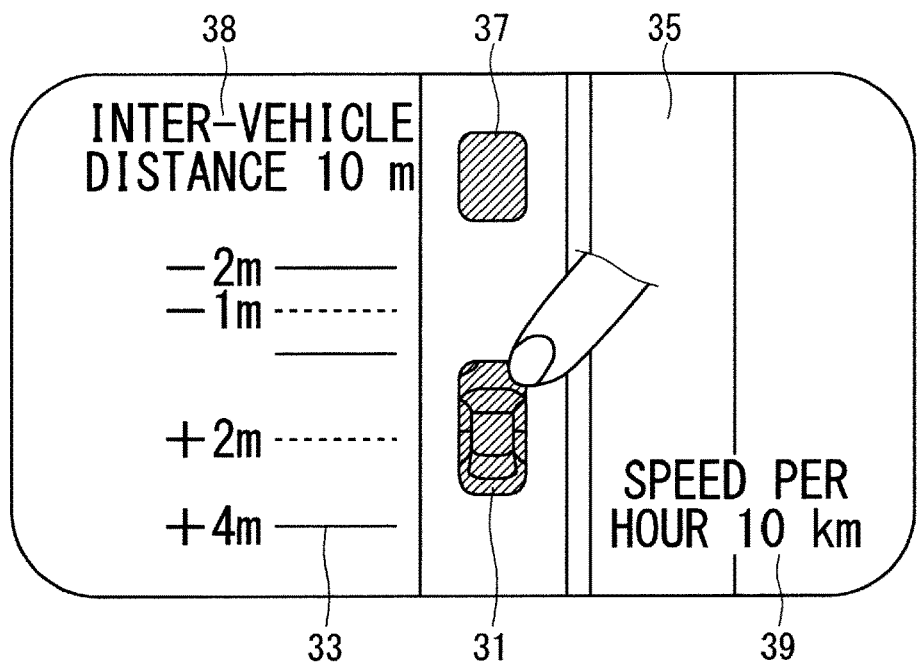
FIG. 29 is a diagram of an example of the change operation screen according to the third embodiment.

Further, the step size setting unit 14 may set a plurality of step sizes for each of the increase and decrease directions of the inter-vehicle distance. For example, the step size setting unit 14 sets, for the increase direction of the inter-vehicle distance, a first step size of 2 m in accordance with association shown in FIG. 26, and sets a second step size of 4 m that is twice the first step size of 2 m. Further, the step size setting unit 14 sets, for the decrease direction of the inter-vehicle distance, a first step size of 1 m that is a half of the first step size for the increase direction of the inter-vehicle distance, and sets a second step size of 2 m that is twice the first step size of 1 m. FIG. 29 shows a change operation screen on which the plurality of step sizes are displayed. In FIG. 29, for both the increase and decrease directions of the inter-vehicle distance, graduations 33 of the first step sizes are displayed by broken lines, and graduations 33 of the second step sizes are displayed by solid lines.

Figure 30:
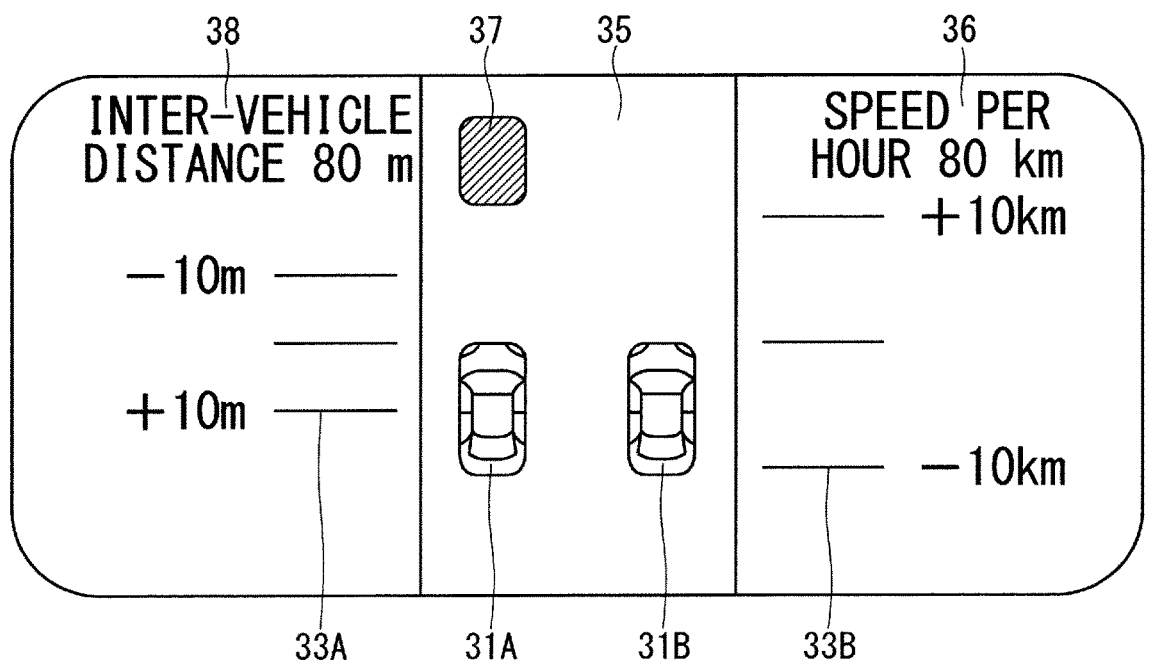
FIG. 30 is a diagram of an example of the change operation screen according to the third embodiment.

In the third embodiment, the description has been given of changing the inter-vehicle distance from the preceding vehicle under the follow-up travel control, and in the second embodiment, the description has been given of changing the steady travel speed under the steady travel control. The inter-vehicle distance and the steady travel speed may be changed simultaneously on one change operation screen when the autonomous driving control device 23 is performing adaptive cruise control on the vehicle. FIG. 30 shows a display example of the change operation screen on which the inter-vehicle distance and the steady travel speed can be changed. As shown in FIG. 30, in a left half of the change operation screen, an own vehicle icon 31A, the preceding vehicle icon 37, graduations 33A of the step size of the inter-vehicle distance, and the inter-vehicle distance 38 are arranged, and in a right half of the change operation screen, an own vehicle icon 31B, graduations 33B of the step size the steady travel speed, and a steady travel speed 36 are arranged. The driver can change the inter-vehicle distance 38 by operating the own vehicle icon 31A and can change the steady travel speed 36 by operating the own vehicle icon 31B.

Figure 31:
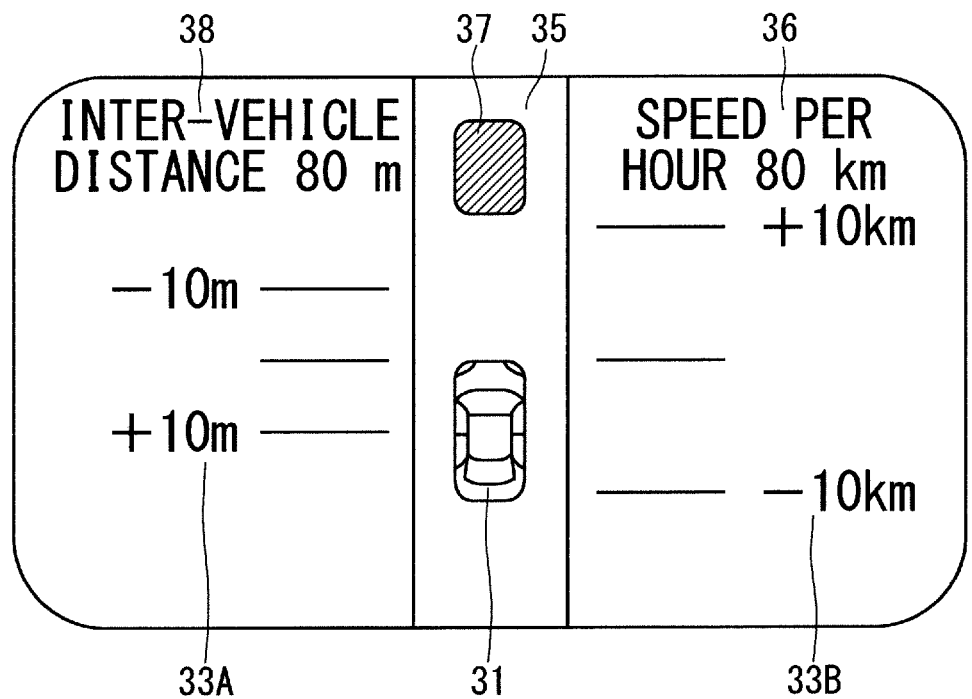
FIG. 31 is a diagram of an example of the change operation screen according to the third embodiment.

Further, in the example of FIG. 30, one own vehicle icon is displayed for each autonomous driving control parameter to be changed, but the one own vehicle icon may be used for a plurality of autonomous driving control parameters. FIG. 31 shows a change operation screen in such an example, showing an example in which the operation for changing the inter-vehicle distance 38 and the operation for changing the steady travel speed 36 are performed using one own vehicle icon 31. In this configuration, the parameter changing unit 13 identifies a type of the gesture operation and changes a corresponding autonomous driving control parameter, such as changing the inter-vehicle distance with the graduations 33A of the step size of the inter-vehicle distance applied to the flick operation on the own vehicle icon 31, and changing the steady travel speed with the graduations 33B of the step size of the steady travel speed applied to the drag operation on the own vehicle icon 31.

D. Fourth Embodiment

Figure 32:
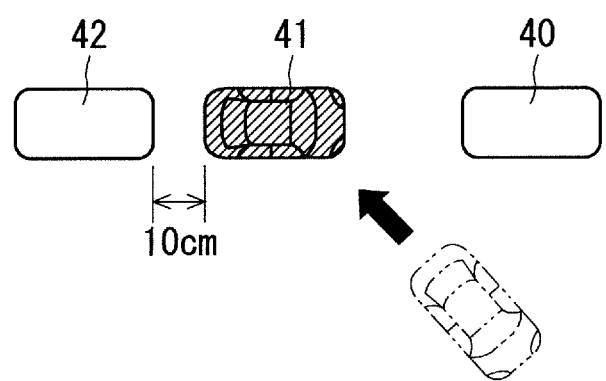
FIG. 32 is a conceptual diagram of parallel parking.

FIG. 32 shows how an own vehicle 41 is parked in parallel in a space between a vehicle 40 and a vehicle 42 under autonomous parking control of the autonomous driving control device 23. Under the autonomous parking control, a margin distance between the own vehicle 41 and the vehicle 42 behind own vehicle 41 is defined as an approachable distance, and the autonomous driving control device 23 performs the autonomous parking control in accordance with the approachable distance. For example, when the approachable distance is 10 cm, as shown in FIG. 32, the autonomous driving control device 23 performs parking control on the own vehicle 41 with a space of 10 cm or more from the vehicle 42 provided.

An autonomous driving control parameter changing device according to the fourth embodiment of the present invention performs a process of changing the approachable distance from a nearby vehicle or an obstacle under the autonomous parking control as an example of the autonomous driving control parameter of the present invention. A structure of the autonomous driving control parameter changing device according to the fourth embodiment is similar to the structure in the first embodiment shown in FIG. 1; thus, a description will be given below of the autonomous driving control parameter changing device according to the fourth embodiment with the same reference numerals given to the same components as the components in the first embodiment.

<D-1. Process of Changing Approachable Distance>

Figure 33:
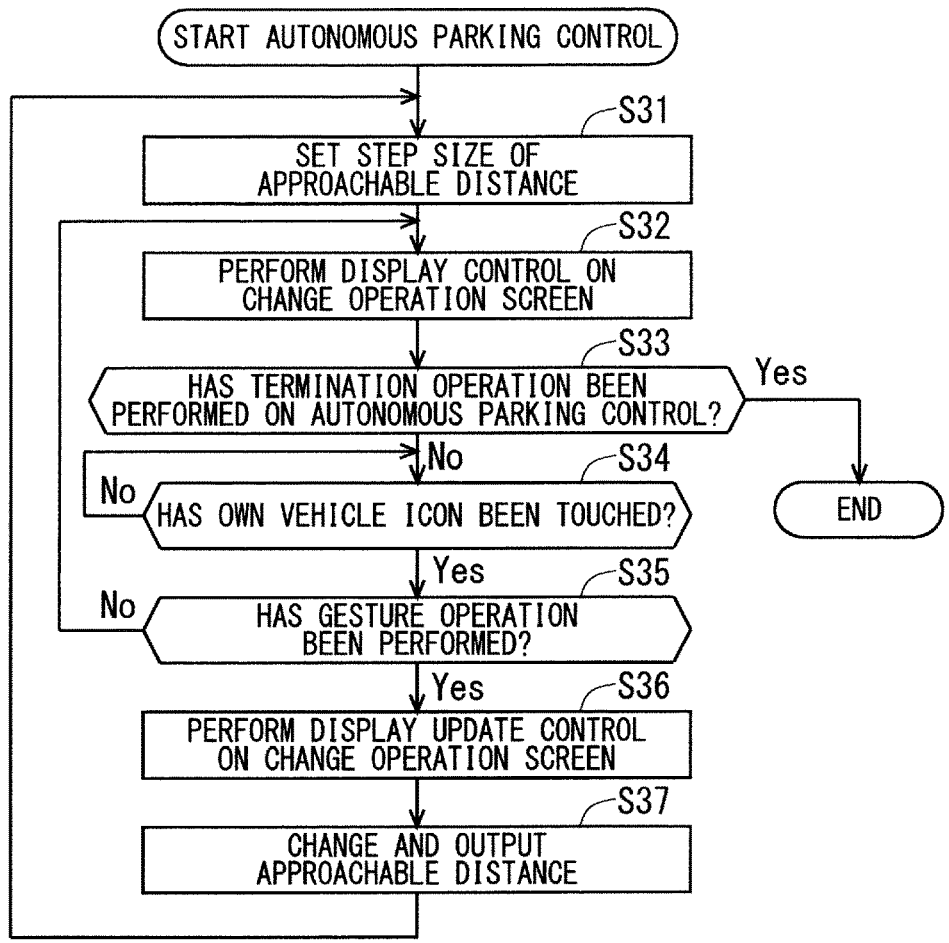
FIG. 33 is a flowchart of an operation of an autonomous driving control parameter changing device according to a fourth embodiment.

A description will be given below of the process of changing the approachable distance under the autonomous parking control performed by an autonomous driving control parameter changing device 1A according to the fourth embodiment with reference to a flow shown in FIG. 33.

Figure 34:
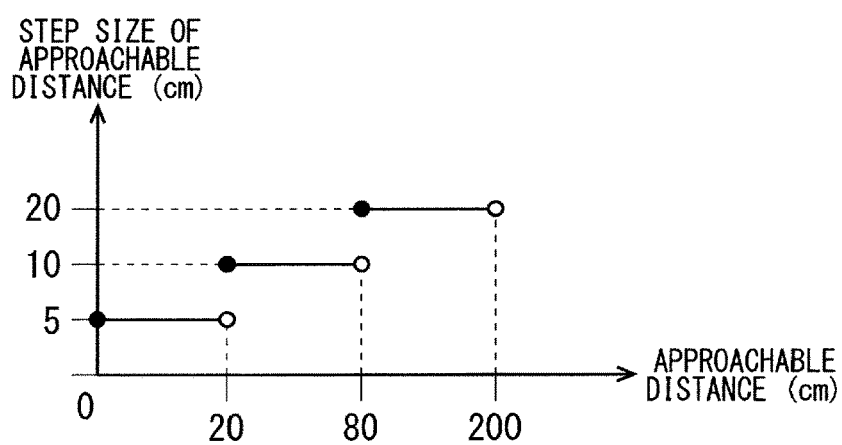
FIG. 34 is a diagram of a relation between an approachable distance and a step size of the approachable distance.

When the autonomous driving control device 23 starts the autonomous parking control of the own vehicle, a step size setting unit 14 sets a step size of the approachable distance (step S31). The step size setting unit 14 sets the step size based on the approachable distance. FIG. 34 shows a relation between the approachable distance and the step size of the approachable distance. According to the example shown in FIG. 34, the step size of the approachable distance is 5 cm when the approachable distance is greater than or equal to 0 cm and less than 20 cm, the step size of the approachable distance is 10 cm when the approachable distance is greater than or equal to 20 cm and less than 80 cm, the step size of the approachable distance is 20 cm when the approachable distance is greater than or equal to 80 cm and less than 200 cm. As described above, the step size of the approachable distance gradually increases in accordance with the approachable distance.

Figure 35:
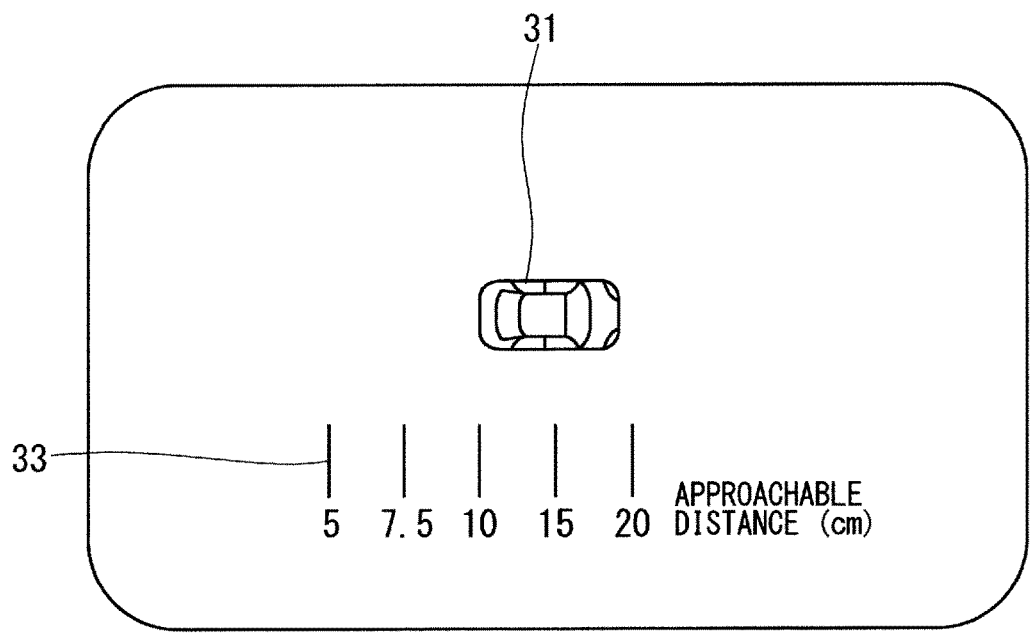
FIG. 35 is a diagram of an example of a change operation screen according to the fourth embodiment.

Next, a display control unit 11 performs display control on a change operation screen of the approachable distance (hereinafter, simply referred to as "change operation screen") (step S32). FIG. 35 shows an example of the change operation screen displayed on a display device 21 in step S32. On this change operation screen, not only an own vehicle icon 31 that is an operation target icon, but also graduations 33 of the step size of the approachable distance are displayed. The own vehicle icon 31 is oriented in a left-right direction of the change operation screen, and a movement direction of the own vehicle icon 31 is the left-right direction of the change operation screen. Further, the graduations 33 of the step size are arranged corresponding to a movement region of the own vehicle icon 31 so that values on the graduations 33 indicated by the own vehicle icon 31 changes whenever the own vehicle icon 31 moves.

On the change operation screen shown in FIG. 35, a graduation indicating a current approachable distance of 10 cm is displayed at a position in alignment with a rear end of the own vehicle icon 31 (a left end in FIG. 35), graduations 33 of 15 cm and 20 cm are displayed on a right side of the graduation, and graduations 33 of 7.5 cm and 5 cm are displayed on a left side of the graduation. That is, a label of the graduations 33 indicates not the step size itself but the approachable distance changed by the step size. Here, the step size setting unit 14 sets, for an increase direction of the approachable distance, a first step size of 5 cm in accordance with the association shown in FIG. 34 and a second step size of 10 cm that is twice the first step size. Further, the step size setting unit 14 sets, for a decrease direction of the approachable distance, a first step size of 2.5 cm that is a half of the first step size for the increase direction and a second step size of 5 cm that is twice the first step size.

The driver can grasp that the driver should look at the change operation screen, and move the own vehicle icon 31 rightward to increase the approachable distance, that is, to increase the distance between the own vehicle and another vehicle or an obstacle and move the own vehicle icon 31 leftward to decrease the approachable distance, that is, to decrease the distance between the own vehicle and another vehicle or the obstacle.

Next, the autonomous driving control parameter changing device 1A determines whether a termination operation has been performed on the autonomous parking control (step S33). The driver can input the termination operation on the autonomous parking control from an input device (not shown) to the autonomous driving control parameter changing device 1A after, for example, the vehicle stops. When the termination operation has been performed on the autonomous parking control, the autonomous driving control parameter changing device 1A terminates the process of changing the approachable distance, and when no termination operation has been performed on the autonomous parking control, the flow proceeds to step S34.

Figure 36:
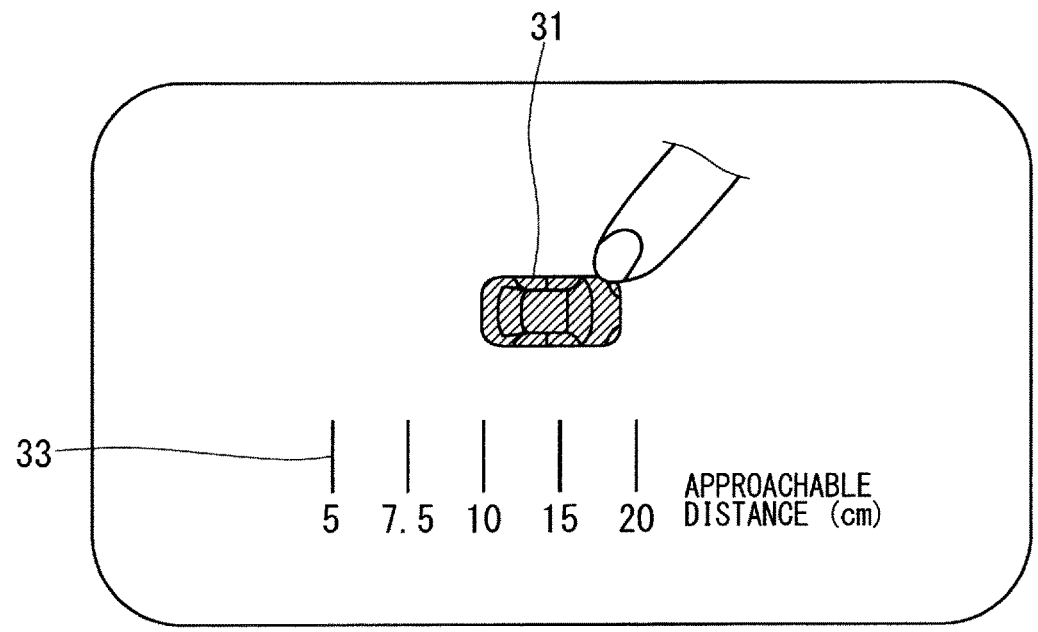
FIG. 36 is a diagram of an example of the change operation screen according to the fourth embodiment.

In step S34, a gesture operation acquisition unit 12 determines whether a touch operation has been performed on the own vehicle icon 31. When no touch operation has been performed on the own vehicle icon 31, step S34 is repeated until the touch operation is performed, and when the touch operation has been performed, the flow proceeds to step S35. Note that when the touch operation has been performed on the own vehicle icon 31, the display control unit 11 causes the display device 21 to highlight the own vehicle icon 31 as shown in FIG. 36 to make it easy to visually recognize that the own vehicle icon 31 is being touched.

Next, the gesture operation acquisition unit 12 determines whether a gesture operation has been performed (step S35). When no gesture operation has been performed within a certain period of time from the touch operation performed on the own vehicle icon 31, the flow returns to step S32. When the display control unit 11 has highlighted the own vehicle icon 31, the display control unit 11 returns the own vehicle icon 31 to a state where the own vehicle icon 31 is not highlighted.

On the other hand, when the gesture operation has been performed within the certain period of time from the touch operation performed on the own vehicle icon 31, the display control unit 11 performs display update control on the change operation screen based on the gesture operation (step S36). Specifically, the display control unit 11 changes a display position of the own vehicle icon 31 in accordance with the gesture operation, and changes a display mode of a graduation 33 displayed in a movement direction of the own vehicle icon 31.

Figure 37:
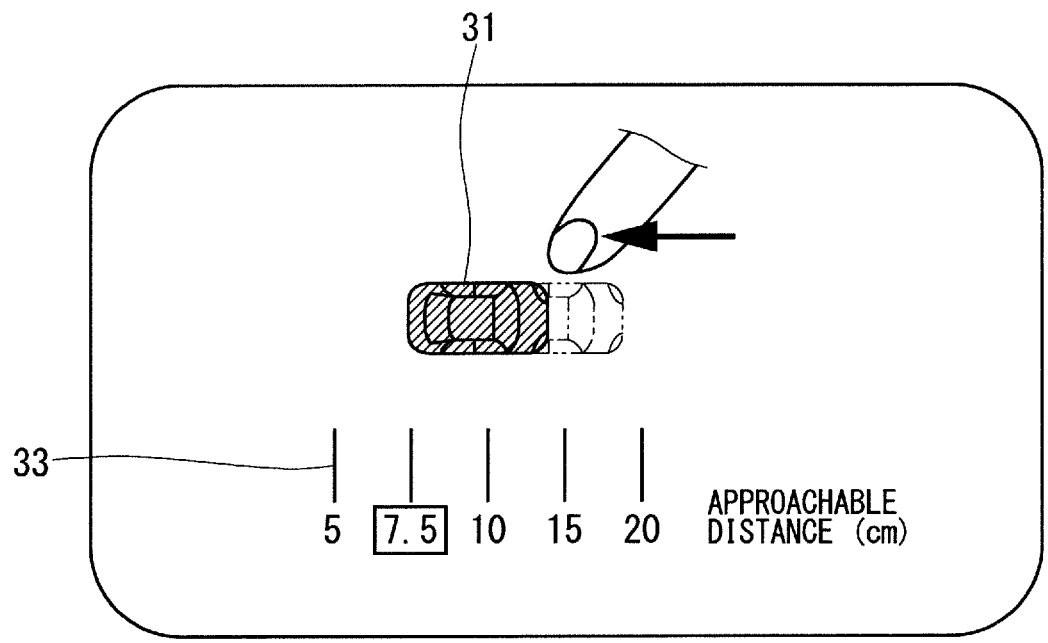
FIG. 37 is a diagram of an example of the change operation screen according to the fourth embodiment.

FIG. 37 shows a change operation screen displayed on the display device 21 in step S36. As shown in FIG. 37, dragging the own vehicle icon 31 leftward moves the own vehicle icon 31 leftward on the change operation screen, and further "7.5 m" that is a label of the graduation 33 is highlighted.

Next, a parameter changing unit 13 decreases the approachable distance by the step size of 2.5 cm from current 10 cm to 7.5 cm and outputs the approachable distance thus changed to the autonomous driving control device 23 (step S37).

Figure 38:
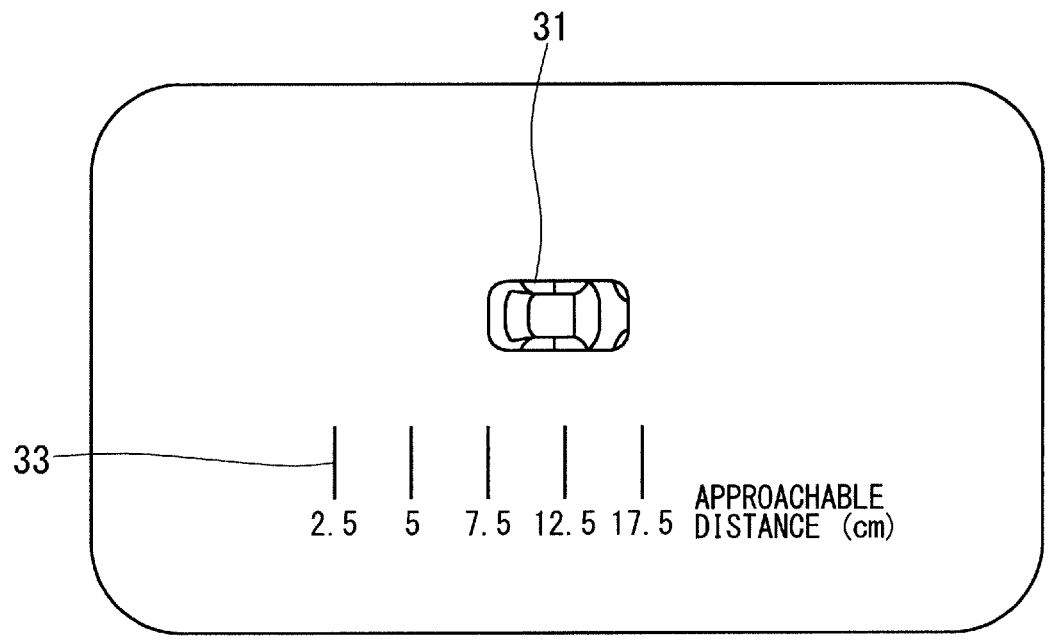
FIG. 38 is a diagram of an example of the change operation screen according to the fourth embodiment.

Next, the flow returns to step S31, and the step size setting unit 14 updates, if necessary, the step size in accordance with the approachable distance changed. Then, the display control unit 11 performs display control on the change operation screen (step S32). FIG. 38 shows the change operation screen displayed on the display device 21. On the change operation screen shown in FIG. 38, the own vehicle icon 31 returns to an initial position, the highlighting of the own vehicle icon 31 is cleared, and the labels of the graduations 33 of the step size is updated based on a value of the approachable distance changed in step S37. Here is the end of the process of changing the approachable distance performed by the autonomous driving control parameter changing device 1A.

E. Fifth Embodiment

In the second to fourth embodiments, when the own vehicle icon 31 is dragged, the graduation 33 of the step size corresponding to the position of the own vehicle icon 31 is highlighted so that the driver can grasp how much the own vehicle icon 31 needs to be dragged. In the fifth embodiment, tactile feedback control on the touch surface in place of or along with the highlighting of the graduation 33 of the step size allows the driver to grasp a necessary drag amount.

Figure 39:
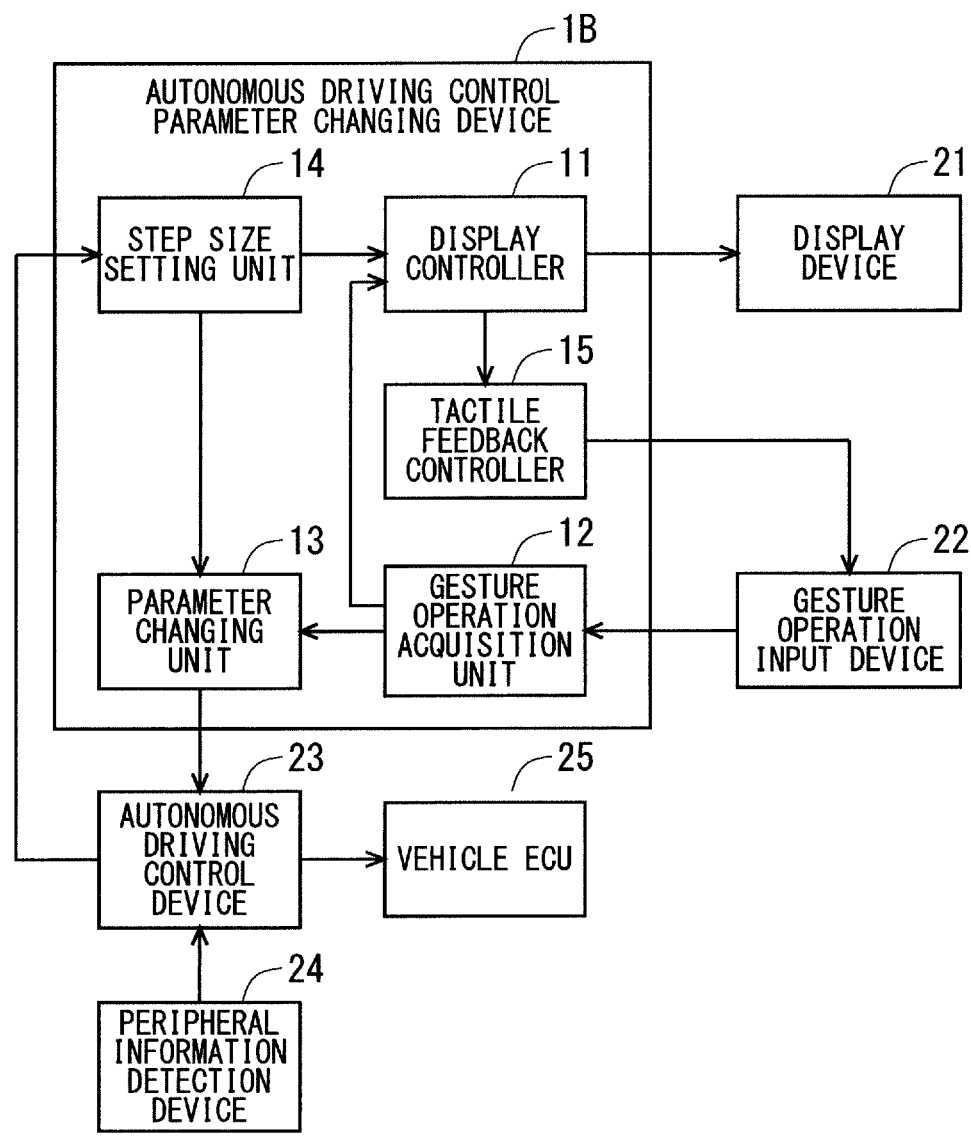
FIG. 39 is a block diagram of a structure of an autonomous driving control parameter changing device according to a fifth embodiment.

FIG. 39 is a block diagram of a structure of an autonomous driving control parameter changing device 1B according to the fifth embodiment. The autonomous driving control parameter changing device 1B includes, in addition to the components of the autonomous driving control parameter changing device 1A according to the first to forth embodiments, a tactile feedback control unit 15 that controls tactile feedback of a touch surface of a gesture operation input device 22.

The tactile feedback control unit 15 acquires a display position of the graduation 33 of the step size from a display control unit 11 and performs control to change the tactile feedback at a position of the touch surface of the gesture operation input device corresponding to the display position of the graduation 33 of the step size.

Figure 16:
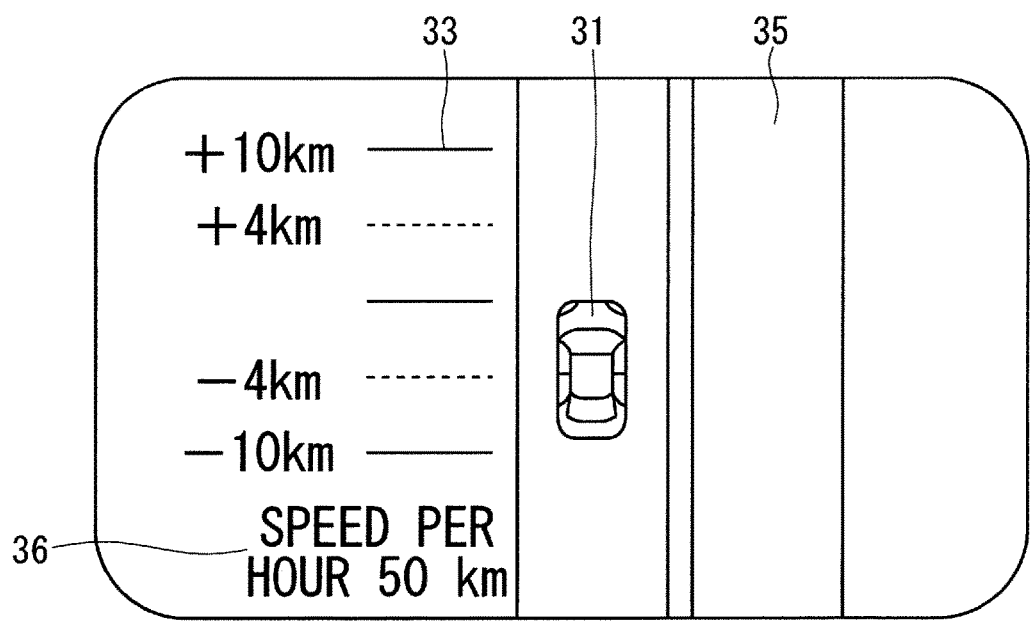
FIG. 16 is a diagram of an example of the change operation screen according to the second embodiment.
Figure 40:
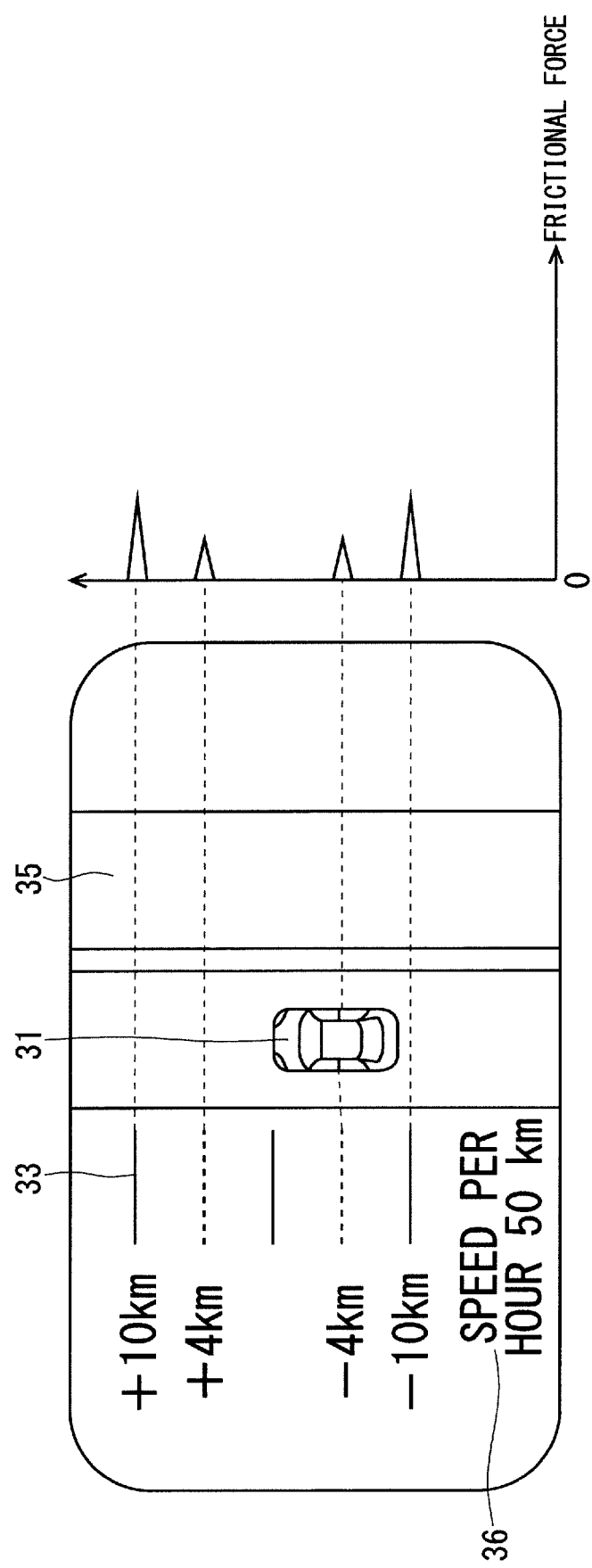
FIG. 40 is a diagram for describing tactile feedback control of a touch surface in accordance with a display position of graduations of the step size of the change operation screen.

FIG. 40 shows a change in frictional force in a vertical position of a change operation screen shown in FIG. 16. As shown in FIG. 40, when an own vehicle icon 31 is dragged to the display position of the graduation 33 of the step size, the tactile feedback control unit 15 increases the frictional force of the touch surface of the gesture operation input device 22, thereby allowing the driver to grasp the necessary drag amount of the own vehicle icon 31 without paying attention to the change operation screen. Further, as shown in FIG. 40, when a plurality of the step sizes are provided, the frictional force may be changed in accordance with the step sizes, for example, a frictional force of the touch surface applied to the graduation 33 of the step size of 10 km is made greater than a frictional force applied to the graduation 33 of the step size of 4 km.

In the above description, the control of the frictional force has been exemplified as a method of controlling the tactile feedback, but the tactile feedback control unit 15 may perform the tactile feedback control using vibration, temperature, or the like.

F. Hardware Structure

Figure 41:
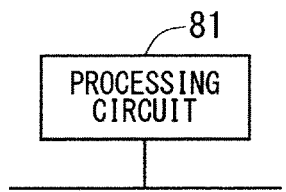
FIG. 41 is a diagram of a hardware structure of the autonomous driving control parameter changing device according to the present invention.

The display control unit 11, the gesture operation acquisition unit 12, the parameter changing unit 13, the step size setting unit 14, and the tactile feedback control unit 15 (hereinafter, referred to as "display control unit 11 and the like") in the autonomous driving control parameter changing device 1A, 1B are implemented by a processing circuit 81 shown in FIG. 41. That is, the processing circuit 81 includes the display control unit 11 that causes the display device 21 to display the change operation screen of the autonomous driving control parameter including the display of the operation target icon and step size, the gesture operation acquisition unit 12 that acquires information on the gesture operation for moving the operation target icon in the predetermined direction, the parameter changing unit 13 that changes the autonomous driving control parameter in the increase or decrease direction defined in association with the movement direction in which the operation target icon is moved by the gesture operation, and the step size setting unit 14 that variably sets the step size of the autonomous driving control parameter based on the predetermined condition. Dedicated hardware or a processor that executes a program stored in a memory may be applied to the processing circuit 81. The processor is, for example, a central processing unit, a processing unit, an arithmetic unit, a microprocessor, a microcomputer, a digital signal processor, or the like.

In a configuration where the processing circuit 81 is dedicated hardware, the processing circuit 81 may be, for example, a single circuit, a composite circuit, a programmed processor, a parallel-programmed processor, an application specific integrated circuit (ASIC), a field-programmable gate array (FPGA), or a combination thereof. Respective functions of the components, that is, the display control unit 11 and the like may be implemented by a plurality of the processing circuits 81, or the functions of the components may be collectively implemented by one processing circuit.

Figure 42:
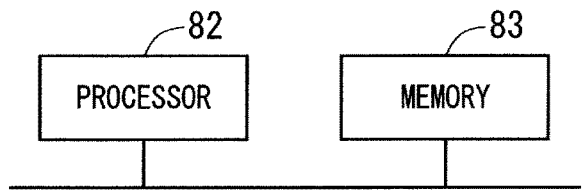
FIG. 42 is a diagram of a hardware structure of the autonomous driving control parameter changing device according to the present invention.

When the processing circuit 81 is a processor, the functions of the display control unit 11 and the like are implemented by a combination of software and the like (software, firmware, or software and firmware). Software and the like are described as a program stored in the memory. As shown in FIG. 42, a processor 82 applied to the processing circuit 81 reads out the program stored in a memory 83 and executes the program to implement the functions of the components. That is, the autonomous driving control parameter changing device 1A, 1B includes the memory 83 storing the program that is executed by the processing circuit 81 to thereby perform a step of causing the display device 21 to display the change operation screen of the autonomous driving control parameter including the display of the operation target icon and step size, a step of acquiring information on the gesture operation for moving the operation target icon in the predetermined direction, a step of changing the autonomous driving control parameter in the increase or decrease direction defined in association with the movement direction in which the operation target icon is moved by the gesture operation, and a step of variably setting the step size based on the predetermined condition, the step size corresponding to an amount of change in the autonomous driving control parameter per gesture operation. In other words, it can be said that this program causes the computer to perform the procedure and method of the display control unit 11 and the like. Here, the memory 83 may be any one of a nonvolatile or volatile semiconductor memory, such as a random access memory (RAM), a read only memory (ROM), a flash memory, an electrically programmable read only memory (EPROM), or an electrically erasable programmable read only memory (EEPROM), a hard disk drive (HDD), a magnetic disk, a flexible disk, an optical disc, a compact disc, a mini disc, a digital versatile disc (DVD), a drive device thereof, and the like, or may be any storage element or storage device to be available in the future.

In the above, the description has been given of the configuration in which the respective functions of the display control unit 11 and the like are implemented by either hardware or software and the like. However, the present invention is not limited to such a configuration, and a configuration may be employed in which some components of the display control unit 11 and the like are implemented by dedicated hardware, and the other components are implemented by software and the like. For example, the function of the display control unit 11 can be implemented by a processing circuit serving as dedicated hardware, and the functions of the other components can be implemented by the program stored in the memory 83 that is read out and executed by the processing circuit 81 serving as the processor 82.

As described above, the processing circuit can implement the above-described functions by hardware, software and the like, or a combination thereof.

Further, the autonomous driving control parameter changing device 1A, 1B described above is also applicable to a system constituted of either only an in-vehicle device or an appropriate combination of an in-vehicle device, a portable navigation device, a communication terminal (for example, a mobile terminal such as a mobile phone, a smartphone, or a tablet) and functions of applications installed in these devices, a server, and the like. In this configuration, the functions or components of the autonomous driving control parameter changing device 1A, 1B described above may be dispersedly located in the devices constituting the system, or may be concentrated in any one of the devices.

Figure 43:
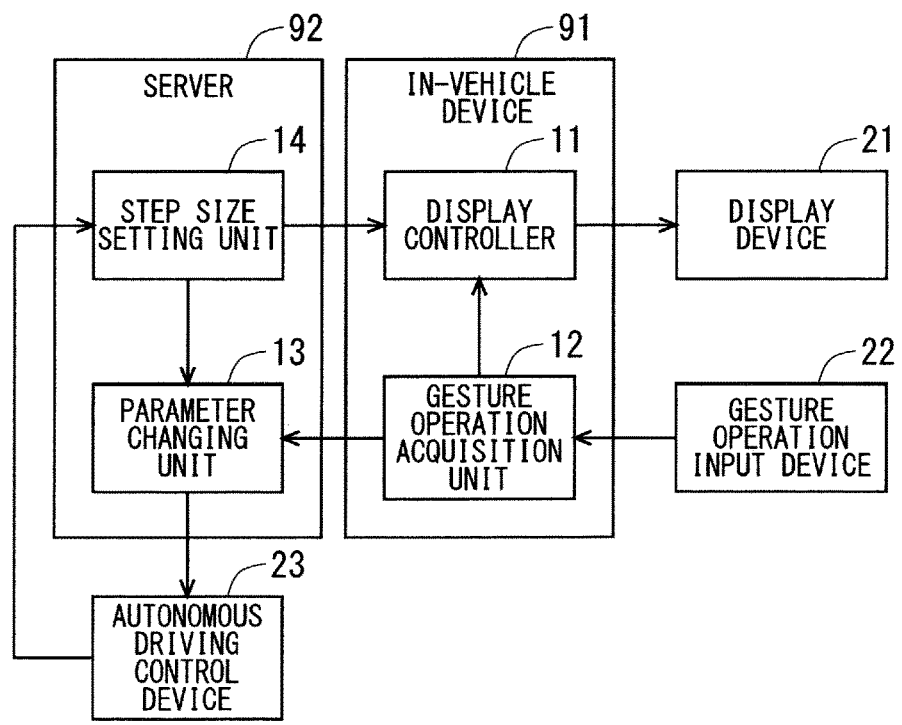
FIG. 43 is a block diagram of an example of the structure of the autonomous driving control parameter changing device constituted of an in-vehicle device and a server.

FIG. 43 shows an example of the structure of the autonomous driving control parameter changing device 1A, 1B constituted of an in-vehicle device 91 and a server 92. As shown in FIG. 43, the display control unit 11 and the gesture operation acquisition unit 12 are included in the in-vehicle device 91, and the parameter changing unit 13 and the step size setting unit 14 are included in the server 92.

Note that the present invention can be implemented by any combination of the embodiments within the scope of the present invention, and each of the embodiments can be modified or omitted as appropriate.

Although the present invention has been described in detail, the above descriptions are illustrative in all aspects, and the present invention is not limited by the descriptions. It is understood that innumerable modifications not illustrated can be envisaged without departing from the scope of the present invention.

EXPLANATION OF REFERENCE SIGNS 1A, 1B: autonomous driving control parameter changing device
11: display control unit
12: gesture operation acquisition unit
13: parameter changing unit
14: step size setting unit
15: tactile feedback control unit
21: display device
22: gesture operation input device
23: autonomous driving control device
24: peripheral information detection device
25: vehicle ECU
31, 31A, 31B: own vehicle icon
33, 33A, 33B: graduation
35: road image
37: preceding vehicle icon
81: processing circuit
82: processor
83: memory
91: in-vehicle device
92: server

The invention claimed is:

1. An autonomous driving control parameter changing device comprising:
a processor to execute a program; and
a memory to store the program which, when executed by the processor, performs processes of,
displaying, on a display, a change operation screen of an autonomous driving control parameter including an operation target icon, wherein the autonomous driving control parameter is a parameter used by an autonomous driving controller to perform autonomous driving control of a vehicle;
acquiring information on a gesture operation for moving the operation target icon in a predetermined direction;
changing the autonomous driving control parameter in an increase or decrease direction defined in association with a movement direction in which the operation target icon is moved by the gesture operation, wherein each change to the autonomous driving control parameter causes a corresponding change to the autonomous driving control of the vehicle performed by the autonomous driving controller; and
variably setting a step size based on a predetermined condition, the step size corresponding to an amount of change in the autonomous driving control parameter per occurrence of the gesture operation, wherein the change operation screen displays the step size.

2. The autonomous driving control parameter changing device according to claim 1, wherein
the change operation screen displays graduations arranged corresponding to a movement region of the operation target icon.

3. The autonomous driving control parameter changing device according to claim 2, wherein
the program, when executed by the processor, performs processes of acquiring the information on the gesture operation from a touch surface used for inputting the gesture operation, and
controlling a tactile feedback of the touch surface.

4. The autonomous driving control parameter changing device according to claim 1, wherein
the program, when executed by the processor, performs processes of setting a plurality of the step sizes.

5. The autonomous driving control parameter changing device according to claim 4, wherein
the program, when executed by the processor, performs processes of setting the step sizes different for each of the increase and decrease directions of the autonomous driving control parameter.

6. The autonomous driving control parameter changing device according to claim 4, wherein
when the gesture operation is a drag operation, the program, when executed by the processor, performs processes of changing the autonomous driving control parameter by a selected one of the plurality of the step sizes based on a drag amount of the drag operation.

7. The autonomous driving control parameter changing device according to claim 1, wherein
the autonomous driving control parameter is a steady travel speed under steady travel control.

8. The autonomous driving control parameter changing device according to claim 7, wherein
the program, when executed by the processor, performs processes of setting the step size variably based on the steady travel speed.

9. The autonomous driving control parameter changing device according to claim 1, wherein
when the gesture operation is a plurality of flick operations performed successively within a predetermined period of time, the program, when executed by the processor, performs processes of setting the step size for a second or subsequent flick operation smaller than the step size for a first flick operation.

10. The autonomous driving control parameter changing device according to claim 1, wherein
the autonomous driving control parameter is an inter-vehicle distance from a preceding vehicle under follow-up travel control.

11. The autonomous driving control parameter changing device according to claim 10, wherein
the program, when executed by the processor, performs processes of setting the step size variably based on a travel speed of the vehicle.

12. The autonomous driving control parameter changing device according to claim 10, wherein
the program, when executed by the processor, performs processes of setting the step size variably based on the inter-vehicle distance.

13. The autonomous driving control parameter changing device according to claim 1, wherein
the autonomous driving control parameter is an approachable distance from a nearby vehicle or an obstacle under autonomous parking control.

14. An autonomous driving control parameter changing method for changing an autonomous driving control parameter that is a parameter used by an autonomous driving controller to perform autonomous driving control of a vehicle, the autonomous driving control parameter changing method comprising:
displaying, on a display, a change operation screen of the autonomous driving control parameter including an operation target icon;
acquiring information on a gesture operation for moving the operation target icon in a predetermined direction;
changing the autonomous driving control parameter in an increase or decrease direction defined in association with a movement direction in which the operation target icon is moved by the gesture operation, wherein each change to the autonomous driving control parameter causes a corresponding change to the autonomous driving control of the vehicle performed by the autonomous driving controller; and setting a step size variably based on a predetermined condition, the step size corresponding to an amount of change in the autonomous driving control parameter per occurrence of the gesture operation, wherein the change operation screen displays the step size.

\* \* \* \* \*